US012576746B2

(12) United States Patent　　　(10) Patent No.: US 12,576,746 B2
Zeidler　　　　　　　　　　　　　(45) Date of Patent: Mar. 17, 2026

(54) LAWN TRACTOR WITH REMOVABLE BATTERY PACKS

(71) Applicant: Briggs & Stratton, LLC, Wauwatosa, WI (US)

(72) Inventor: Nicholas J. Zeidler, Brookfield, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 683 days.

(21) Appl. No.: 17/964,567

(22) Filed: Oct. 12, 2022

(65) Prior Publication Data

US 2023/0119910 A1　　Apr. 20, 2023

Related U.S. Application Data

(60) Provisional application No. 63/255,482, filed on Oct. 14, 2021.

(51) Int. Cl.
　　*B60L 53/80*　　　(2019.01)
　　*B60L 50/64*　　　(2019.01)
　　　　　　(Continued)

(52) U.S. Cl.
　　CPC .............. *B60L 53/80* (2019.02); *B60L 50/64* (2019.02); *H01M 10/0525* (2013.01);
　　　　　　(Continued)

(58) Field of Classification Search
　　CPC ........... H01M 2220/20; H01M 50/271; H01M 50/264; H01M 50/249; H01M 50/209;
　　　　　　(Continued)

(56) References Cited

U.S. PATENT DOCUMENTS 5,228,531 A * 7/1993 Patterson ................ B60R 16/04
　　　　　　　　　　　　　　　　180/68.5
5,360,307 A * 11/1994 Schemm ................... B62B 3/10
　　　　　　　　　　　　　　　　180/68.5
(Continued)

FOREIGN PATENT DOCUMENTS

AU　　2020417332 B2 * 10/2024 ............. A01D 34/64
CN　　203423971 U * 2/2014 ......... H01M 50/204
(Continued)

OTHER PUBLICATIONS

Zero Turn Riding Mower,ZT4200L,Nov. 6, 2020, 22 pages.
(Continued)

*Primary Examiner* — Arpad Fabian-Kovacs
(74) *Attorney, Agent, or Firm* — Foley & Lardner LLP

(57) ABSTRACT

A ride-on outdoor power equipment, comprising a chassis a pair of front wheels coupled with the chassis, a pair of rear wheels coupled with the chassis, a mower deck supported by the chassis, and a battery assembly configured to power a drive motor. The battery assembly may include a plurality of battery packs, and a receptacle defined in part by a bottom wall. The receptacle may include a plurality of bays, each bay having a receiver extending away from the bottom wall, the receiver configured to guide a battery pack within the bay, and a power connector spaced a distance from the bottom wall, the power connector configured to engage the pack connector to electrically couple the battery pack to the receptacle, where the receptacle is angled at an acute angle relative to an operating plane.

20 Claims, 13 Drawing Sheets

(51) Int. Cl.

| | |
|---|---|
| *H01M 10/0525* | (2010.01) |
| *H01M 50/209* | (2021.01) |
| *H01M 50/249* | (2021.01) |
| *H01M 50/264* | (2021.01) |
| *H01M 50/271* | (2021.01) |

(52) U.S. Cl.
CPC ....... *H01M 50/209* (2021.01); *H01M 50/249* (2021.01); *H01M 50/264* (2021.01); *H01M 50/271* (2021.01); *H01M 2220/20* (2013.01)

(58) Field of Classification Search
CPC ............ H01M 10/0525; B60L 2200/40; B60L 53/80; B60L 50/66; B60L 50/64; B60K 2001/0494; B60K 2001/0416; B60K 1/04; A01D 69/02; A01D 34/64
See application file for complete search history.

(56) References Cited

U.S. PATENT DOCUMENTS

| | | | | |
|---|---|---|---|---|
| 5,934,053 | A | * | 8/1999 | Fillman .................. A01D 34/44 56/11.9 |
| 6,170,179 | B1 | * | 1/2001 | Paytas ..................... E01H 5/045 37/246 |
| 8,935,907 | B2 | * | 1/2015 | Abe ........................ A01D 34/78 56/320.1 |
| 9,711,767 | B2 | * | 7/2017 | Juenger .................. A01D 69/02 |
| 9,787,225 | B2 | * | 10/2017 | Lucas ..................... E01H 5/045 |
| D942,376 | S | * | 2/2022 | Chung .......................... D13/107 |
| 11,817,731 | B2 | * | 11/2023 | Zeiler ....................... B25F 5/02 |
| 11,910,747 | B2 | * | 2/2024 | Matsumoto ............ A01D 34/81 |
| D1,065,046 | S | * | 3/2025 | Eernisse ..................... D13/103 |
| 2009/0266042 | A1 | * | 10/2009 | Mooney .................. B60L 50/52 56/14.7 |
| 2010/0162674 | A1 | * | 7/2010 | Eaton ................. A01D 34/6818 56/11.9 |
| 2010/0236845 | A1 | | 9/2010 | Ishii et al. |
| 2011/0088362 | A1 | | 4/2011 | Rosa et al. |
| 2015/0240773 | A1 | * | 8/2015 | Koenen ................... F02N 11/12 290/38 R |
| 2022/0190426 | A1 | * | 6/2022 | Zeiler ................. H01M 50/247 |
| 2022/0314819 | A1 | * | 10/2022 | Harvey ............... H01M 50/284 |
| 2022/0410762 | A1 | * | 12/2022 | Yang ...................... A01D 69/02 |
| 2023/0114884 | A1 | * | 4/2023 | Zeidler ................ A01D 34/662 56/16.7 |
| 2023/0225252 | A1 | * | 7/2023 | Liu ........................ A01D 34/78 56/11.9 |

FOREIGN PATENT DOCUMENTS

| | | | | | |
|---|---|---|---|---|---|
| CN | 107205337 | A | | 9/2017 | |
| CN | 112292283 | A | * | 1/2021 | .......... H01M 10/655 |
| CN | 118355782 | A | * | 7/2024 | ........... H02J 7/0042 |
| DE | 19528167 | C1 | * | 8/1996 | ............ A01D 69/02 |
| EP | 3 673 723 | | | 7/2020 | |
| EP | 3 714 679 | A1 | | 9/2020 | |
| EP | 4492668 | A1 | * | 1/2025 | ................ H02J 7/35 |
| GB | 2613953 | A | * | 6/2023 | ......... G01N 21/9515 |
| WO | WO-9605719 | A2 | * | 2/1996 | ........ A01D 34/6806 |
| WO | WO-2018031719 | A1 | * | 2/2018 | ............. B60L 53/80 |
| WO | WO-2019129045 | A1 | * | 7/2019 | ............ A01D 69/02 |
| WO | WO-2019/213407 | A1 | | 11/2019 | |
| WO | WO-2020/077176 | A1 | | 4/2020 | |
| WO | WO-2021134826 | A1 | * | 7/2021 | ............ A01D 69/06 |

OTHER PUBLICATIONS

PCT International Search Report and Written Opinion for International Application No. PCT/US2022/046434, mailing date Jan. 12, 2023, 14 pages.

* cited by examiner

LAWN TRACTOR WITH REMOVABLE BATTERY PACKS

CROSS-REFERENCE TO RELATED PATENT APPLICATIONS

This application claims the benefit of and priority to U.S. Provisional Application No. 63/255,482, filed on Oct. 14, 2021, the entire disclosure of which is hereby incorporated by reference herein.

BACKGROUND

Typically, a user rides on a lawn tractor and the lawn tractor travels over a surface (e.g., ground). In some configurations, a lawn tractor includes rotating cutting blades that cut grass or other vegetation as the lawn tractor travels over the ground.

SUMMARY

At least one embodiment relates to a ride-on outdoor power equipment. The ride-on outdoor power equipment comprises a chassis having a front portion and a rear portion, a pair of front wheels coupled with the chassis, the pair of front wheels located at the front portion of the chassis, and a pair of rear wheels coupled with the chassis, the pair of rear wheels located at the rear portion of the chassis. The ride-on outdoor power equipment includes a mower deck supported by the chassis, the mower deck including a plurality of mower blades, and a battery assembly located at a front portion of the chassis, the battery assembly configured to power a drive motor. The battery assembly includes a plurality of battery packs, each battery pack including a plurality of lithium-ion battery cells and a pack connector, and a receptacle defined in part by a bottom wall, the receptacle comprising a plurality of bays. Each bay includes a receiver extending away from the bottom wall, the receiver configured to guide a battery pack within the bay, and a power connector spaced a distance from the bottom wall, the power connector configured to engage the pack connector to electrically couple the battery pack to the receptacle, where the receptacle is angled at an acute angle relative to an operating plane.

Another embodiment relates to a ride-on outdoor power equipment. The ride-on outdoor power equipment comprises a plurality of battery packs, each battery pack including a plurality of lithium-ion battery cells and a pack connector, and a receptacle defined in part by a bottom wall, the receptacle comprising a plurality of bays. Each bay includes a receiver extending away from the bottom wall, the receiver configured to guide a battery pack within the bay, and a power connector spaced a distance from the bottom wall, the power connector configured to engage the pack connector to electrically couple the battery pack to the receptacle, where at least one of the plurality of battery packs is angled at an acute angle relative to an operating plane.

Another embodiment relates to a ride-on outdoor power equipment. The ride-on outdoor power equipment comprises a receptacle defined in part by a bottom wall, the receptacle comprising a plurality of bays. Each bay includes a receiver extending away from the bottom wall, the receiver configured to guide a battery pack within the bay, and a power connector spaced a distance from the bottom wall, the power connector configured to engage a pack connector to electrically couple the battery pack to the receptacle, where the battery pack includes an upper portion and a lower portion, and a central axis extending between the upper portion and the lower portion, and where the central axis of the battery pack is angled relative to an operating plane.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the Figures. It should also be understood that the terminology is for the purpose of description only and should not be regarded as limiting.

The present disclosure is directed to battery powered chore products or outdoor power equipment. The Figures depict a ride-on lawn tractor that includes a battery assembly having a receptacle that is configured to selectively receive a plurality of battery packs. The battery assembly (e.g., the receptacle) may be angled relative to a plane of the ride-on lawn tractor when the lawn tractor is in a standard position (e.g., operating position), so as to ease the insertion/removal of the battery packs. It should be understood that although described in the context of a lawn tractor, the battery assembly described herein can be applicable to other systems, including outdoor power equipment, vehicles, aerial man lifts, floor care devices, golf carts, lift trucks and other industrial vehicles, recreational utility vehicles, industrial utility vehicles, and lawn and garden equipment. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

Figure 1:
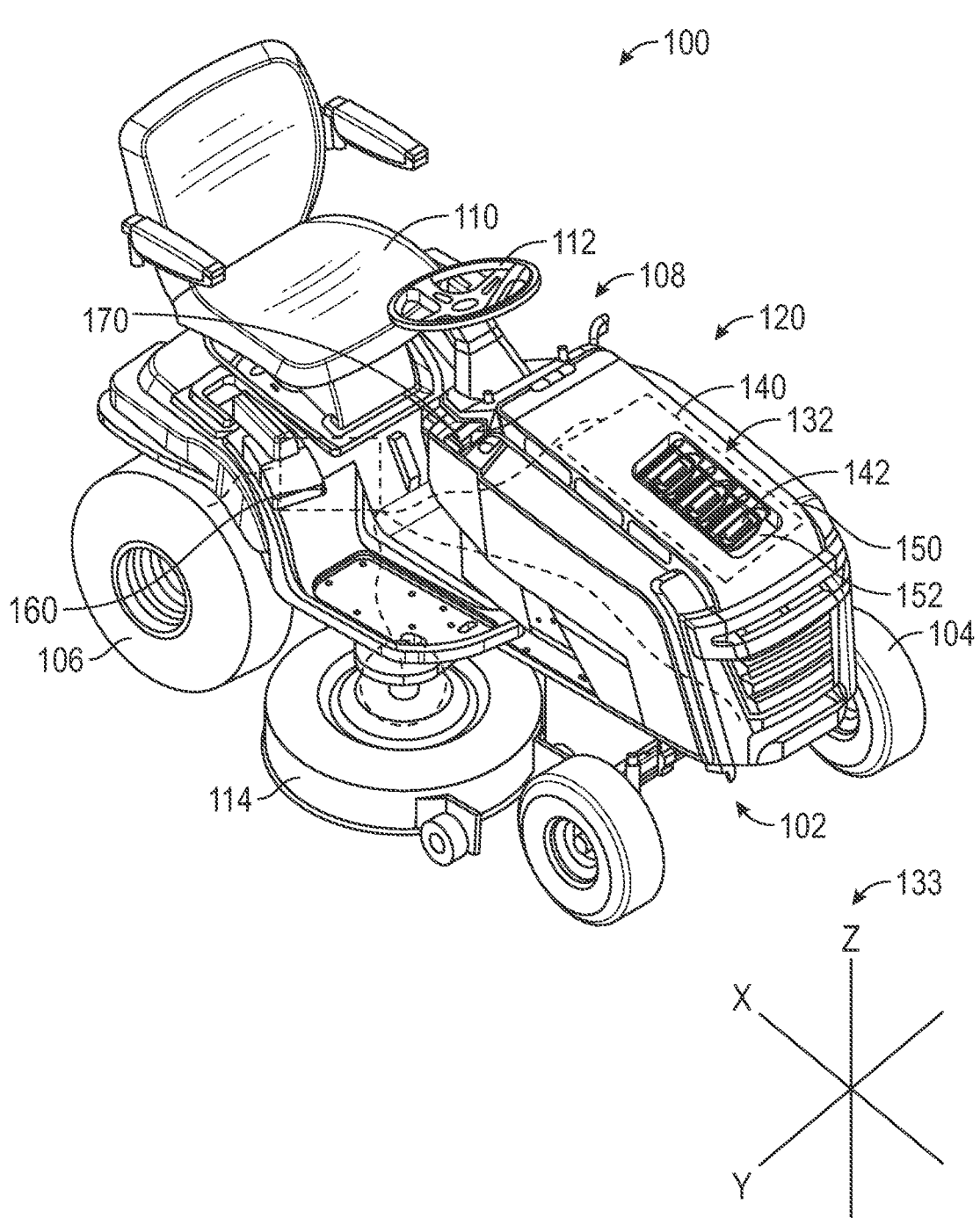
FIG. 1 is a front perspective view of a ride-on lawn tractor, according to an exemplary embodiment.

Referring now to FIG. 1, a piece of outdoor power equipment, shown as a riding lawn tractor 100, is provided (hereinafter "tractor 100"). In an exemplary embodiment, the tractor 100 includes a chassis 102 that supports front wheels 104, rear wheels 106, and/or a deck assembly 108. The chassis 102 may include a plurality of frame members arranged in parallel, which may extend along a longitudinal direction (e.g., a forward and a backward direction) between a front portion and a rear portion of the tractor 100. The frame members of the chassis 102 may be laterally spaced to define a cavity and/or void there between, so as to provide an area for concealing and/or mounting other components of the tractor 100. In some embodiments, the chassis 102 does not include a plurality of frame members; rather, the chassis includes additional, fewer, and/or different working components.

As shown in FIG. 1, the front wheels 104 and the rear wheels 106 are rotatably coupled to the chassis 102 at a front portion and a rear portion, respectively. In an exemplary embodiment, the tractor 100 includes two front wheels 104 that are coupled via a single front axle, and two rear wheels 106 that are coupled via a single rear axle. Also according to an exemplary embodiment, the front wheels 104 are configured to be steerable (e.g., via a steering assembly, a steering wheel, a control system, etc.), and the rear wheels 106 are configured to be driven (e.g., via an actuator, engine, motor, control system, etc.). In some embodiments, the each of the rear wheels 106 is driven independently via a motor (e.g., an electric motor, brushless DC motor, AC motor, a traction motor, etc.) and/or each of the front wheels 104 is steerable via a motor (e.g., an electric motor, brushless DC motor, AC motor, a hub motor, etc.). It should be understood that while the tractor 100 is shown to have four wheels and two axle sets, the tractor 100 may have any suitable wheel configurations, for example single axle sets, dual axle sets, independent axles, with two, four, six, eight, and/or any other suitable number of wheels.

As shown in FIG. 1, the deck assembly 108 includes a seat 110, a steering assembly shown as steering wheel 112, a mower deck shown as mowing assembly 114, and a drive assembly 120. According to an exemplary embodiment, the seat 110 is positioned toward the rear portion of the chassis 102 and extends above the deck assembly 108, and is configured to support a user and/or operator. The steering wheel 112 may be positioned forward relative to the seat 110, and may be manipulated to allow a user and/or operator to control the movement of the tractor 100. In an exemplary embodiment, the steering wheel 112 is configured to control a plurality of motors that drive the rear wheels 106 (and/or the front wheels 104), which allows the tractor 100 to perform precise turning maneuvers. In some embodiments, one or more inputs (e.g., buttons, knobs, handles, levers, etc.) are also positioned proximate to the seat 110, and are configured to selectively activate and/or control components of the tractor 100 (e.g., motors of the mowing assembly 114, motors of the drive assembly 120, etc.). In other embodiments, a series of pedals are positioned within a foot space below the seat 110, and are configured to receive physical commands from a user to power (e.g., drive) the tractor 100.

The mowing assembly 114 may be coupled to a middle portion of the chassis 102 between the front wheels 104 and the rear wheels 106 (e.g., mounted beneath, mounted to a side, etc.), and may be configured to modify (e.g., cut, etc.) a surface. In an exemplary embodiment, the mowing assembly 114 includes a deck (e.g., skirt) that surrounds one or more blades 116 (see, e.g., FIG. 2). Each of the blades 116 may be driven (e.g., powered) via a motor (e.g., an electric motor, brushless DC motor, AC motor, etc.). In some embodiments, the mowing assembly 114 includes additional, fewer, and/or different working components. For example, the mowing assembly 114 may include one or more motors (e.g., for height adjustment, chute controls, etc.), hydraulics (e.g., for actuating the mowing assembly 114 between up/down, mowing/storage, etc.), additional attachments (e.g., chutes, spreaders, blowers, power rakes, vacuum baggers, etc.), sound reducing inserts (e.g., foam, rubber, gel, etc.), power and/or data connections, etc. In this regard, the additional, fewer, and/or different working components of the mowing assembly 114 may also be driven (e.g., powered) via the motors.

In an exemplary embodiment, components of the mowing assembly 114 (e.g., a deck, etc.) are configured to hinge and/or actuate into different positions (e.g., for storage, etc.), so as to reduce the footprint of the tractor 100. In some embodiments, components of the mowing assembly 114 is/are configured to be installed and/or removed (e.g., via a slide on/off mechanism). Further, the mowing assembly 114 may include one or more latching devices, which allow for mating of the mowing assembly 114 and the tractor 100.

In an exemplary embodiment, the drive assembly 120 includes a motor 130 (as shown in at least FIG. 4) and a battery assembly 132. According to an exemplary embodiment, the motor 130 is configured to drive (e.g., power, etc.) components of the tractor 100, for example the rear wheels 106 to propel the tractor 100, etc. In an exemplary embodiment, the motor 130 is an electric motor, for example a DC motor (e.g., a brushless DC motor, a DC shunt motor, a separately excited motor, a series motor, a PMDC motor, a compound motor, etc.), an AC motor (e.g., an induction motor, synchronous motor, etc.), and/or any other suitable electric motor (e.g., a hysteresis motor, reluctance motor, universal motor, etc.). While described herein as only including one motor 130, it should be understood that the drive assembly 120 of the tractor 100 may include a plurality of motors 130 (e.g., traction motor(s), hub or steering motor(s), blade or other implement motors(s), etc.). For example, the tractor 100 may include a plurality of motors 130, with an motor 130 at each rear wheel 106, so as to independently and individually drive (e.g., power) the rear wheels 106. In other embodiments, the drive assembly 120 includes additional, fewer, and/or different working components, which are configured to couple to, and/or interact with, the motor 130 and/or the battery assembly 132. For example, and as will be discussed in further detail below, the drive assembly 120 may include a drive shaft, differential(s), axle shaft(s), universal join(s), constant-velocity joint(s), etc.

In an exemplary embodiment, components of the tractor 100 are positioned or oriented relative to a coordinate system 133. For example, the coordinate system 133 may include an X-axis that is defined longitudinally along a centerline of the tractor 100, a Y-axis that extends perpendicular to the X-axis (e.g., in a direction laterally across the tractor 100 and parallel to a line extending through a center of both of the front wheels 104 or parallel to a line extending through a center of both of the rear wheels 106), and a Z-axis that is arranged perpendicular to both the X-axis and the Y-axis (e.g., perpendicular to a ground on which the tractor 100 travels). The coordinate system 133 may further define an X-Y plane that extends parallel to the X-axis and the Y-axis, an X-Z plane that extends parallel to the X-axis and the Z-axis, a Y-Z plane that extends parallel to the Y-axis and the Z-axis, and/or any other suitable coordinate plane. In an exemplary embodiment, components of the tractor 100 are positioned or oriented relative to an X-Y plane, an X-Z plane, and a Y-Z plane. The X-Y plane can be parallel to the ground 135 (as shown in at least FIG. 2). The chassis 102 (e.g., the frame members), a deck or skirt of the mowing assembly 114, a bottom surface of a base of the deck assembly 108, or other components of the tractor 100 may be aligned with, or parallel to, the X-Y plane. The X-Z plane can be perpendicular to the ground and extend in a forward and rearward direction (e.g., relative to a front portion and a rear portion of the tractor 100). The Y-Z plane can be perpendicular to the ground, and extend in a lateral direction that is perpendicular to a longitudinal plane (e.g., the X-Z plane). In some embodiments, the coordinate system 133 is defined by components of the tractor 100. For example, the X-Y plane may be defined as a plane that is aligned with a deck or skirt of the mowing assembly 114, or a trimming plane of the blades 116 (as shown in at least FIG. 2). The X-Y plane may be defined as a plane that is aligned with, or parallel to, a base of the deck assembly 108, a floor of the deck assembly 108, or another suitable component of the tractor 100.

In an exemplary embodiment, the battery assembly 132 includes one or more swappable battery packs, and is configured to power the motor 130 and/or other components of the tractor 100 (e.g., the steering assembly, the mowing assembly 114, a controller, etc.). As will be discussed in greater detail below, in an exemplary embodiment the battery assembly 132 includes a receptacle 140 and a plurality of battery packs 142. As shown in FIG. 1, the battery assembly 132 is positioned at a front end of the chassis 102 (e.g., forward relative to the seat 110, the steering wheel 112, the mowing assembly 114, etc.), and is angled relative to a plane when the tractor 100 is in a standard (e.g., operating) position. For example, the battery assembly 132 may be angled (e.g., 5, 10, 15, 20, 25, etc. degrees) relative to an operating plane when the tractor 100 is in an operating position (as shown in at least FIG. 2). In this regard, the battery assembly 132 may be angled relative to components of the tractor 100 so as ease the insertion/removal of the battery pack 142 (e.g., via gravitational forces, effects of an angle/incline, etc.). In an exemplary embodiment, the battery assembly 132 is positioned and/or angled relative to the chassis 102, so as to balance the weight of the tractor 100. For example, the battery assembly 132 may be configured to offset (e.g., counteract, counterbalance, etc.) the weight(s) of other component(s) of the tractor 100 (e.g., the mowing assembly 114, the drive assembly 120, etc.), so as to better balance the overall weight of the tractor 100. In other embodiments, the battery assembly 132 is positioned at other portions of the chassis 102 (e.g., the rear portion, a middle portion, etc.), and/or is angled relative to another plane (e.g., vertical plane, an angled plane, etc.) when the tractor 100 is in an operating position.

As shown in FIG. 1, the tractor 100 also includes a cover, shown as hood 150. According to an exemplary embodiment, the hood 150 is rotatably coupled to a front portion of the tractor 100, and is configured to selectively enclose components of the tractor 100 (e.g., the battery assembly 132, the battery packs 142, the motor 130, etc.). In an exemplary embodiment, the hood 150 is rotatable between an open position and a closed position. In this regard, when the hood 150 is in an open position, components of the tractor 100 (e.g., the battery assembly 132, the battery packs 142, the motor 130, etc.) may be partially exposed to the outside environment (e.g., accessible to a user, etc.). Conversely, when the hood 150 is in a closed position, components of the tractor 100 may be enclosed (e.g., housed, etc.) and/or protected from the outside environment. In an exemplary embodiment, the hood 150 is coupled to the front portion of the tractor 100 at a forward portion of the hood 150, and is configured to rotate or pivot forward about a lateral axis relative to the chassis 102. However, in other embodiments, the hood 150 may pivot in other directions when moving from the closed position to the open position (e.g., rearward, laterally, longitudinally, at an angle, etc.) about an axis (e.g., lateral, longitudinal, etc.) relative to the chassis 102.

As shown in FIG. 1, the hood 150 also includes a window, shown as transparent surface 152. The transparent surface 152 may be configured to allow components of the tractor 100 (e.g., the battery assembly 132, the battery packs 142, the motor 130, etc.) to be observed when the hood 150 is in a closed position. In this regard, the transparent surface 152 may allow a user to view characteristics (e.g., charge, configuration, etc.) of the battery assembly 132 when the hood 150 is closed.

As shown in FIG. 1, the tractor 100 also includes a controller 160, which is coupled to the motor 130, the battery assembly 132, and/or other components of the tractor 100 (e.g., the steering assembly, the mowing assembly 114, motors of the tractor 100, etc.). In an exemplary embodiment, the controller 160 includes a processing circuit having a processor and a memory, and is configured to provide control over components of the tractor 100 (e.g., the steering wheel 112, the mowing assembly 114, motor(s) 130, the drive assembly 120, etc.). The processor may be general purpose or specific purpose processor, an application specific integrated circuit (ASIC), one or more field programmable gate arrays (FPGAs), a group of processing components (e.g. parallel processing units), a neural network processing system, and/or any other suitable processor. In an exemplary embodiment, the processor is configured to execute computer code or instructions stored in the memory, and/or received from other computer readable media, such as physical media (e.g. CD-ROM, DVD-Rom, flash drive, etc.), network drives, remote servers, mobile devices, etc. The memory may include one or more devices (e.g. memory units, memory devices, storage devices, etc.) for storing data and/or computer code for completing and/or facilitating the functions and processes described herein. Further, the memory may include random access memory (RAM), read-only memory (ROM) hard drive storage (physical or solid state), temporary storage, non-volatile memory, flash memory, optical memory, or any other suitable memory component for storing software objects and/or computer instructions. In an exemplary embodiment, the memory is communicably connected to the processor via the processing circuit, and includes computer code for executing (e.g. by the processor) one or more processes described herein.

In an exemplary embodiment, the processing circuit also includes one or more circuits for controlling and/or implementing functions of the tractor 100. For example, the controller 160 may include an implement control circuit (e.g., to control characteristics of implements of the mowing assembly 114, for example motors, blades, blowers, chutes, etc.), a drive control circuit (e.g., to control characteristics of components of the drive assembly 120, for example the motor(s) 130, drive shaft, differentials, etc.), an operational control circuit (e.g., to control components of the steering assembly, for example the steering wheel 112, an interface, the controller 160, etc.), a power systems circuit (e.g., to control components of a power system, for example the battery assembly 132, the battery pack 142, the controller 160, etc.), and/or any other circuit suitable to control and/or implement the functions of the tractor 100. Further, the controller 160 may include a communications interface, which may be configured to send/receive information (e.g., data, etc.) to/from other components of the tractor 100 and/or external devices (e.g., a user device, a user application, a network, a server, etc.). In some embodiments, the controller 160 includes additional, fewer, and/or different working components. For example, the controller 160 may include any number of input/output (I/O) connections (e.g., I/O connections of the motor(s) 130, the battery assembly 132, etc.), communication buses, (e.g., for the mowing assembly 114, the drive assembly 120, etc.), etc., which may be connected to one or more components of the tractor 100 (e.g., the battery assembly 132, the motor 130, etc.) in order to send/receive information (e.g., data) relating to components of the tractor 100.

In other embodiments, the tractor 100 includes additional, fewer, and/or different working components. For example, the tractor 100 may also include an ignition interface 170 (e.g., touchscreen, switch, etc.) to start/stop the tractor 100, a sensor (e.g., motion, moisture, magnetic, temperature, chemical, etc.) to provide visual, audio, tactile, etc. feedback, an antenna to communicate with one or more devices (e.g., the controller 160, a mobile device, location device, etc.), counterweights to counteract forces (e.g., weight, etc.) supplied by components of the tractor 100 (e.g., the battery assembly 132, the battery packs 142, etc.), and/or any other suitable component.

Figure 2:
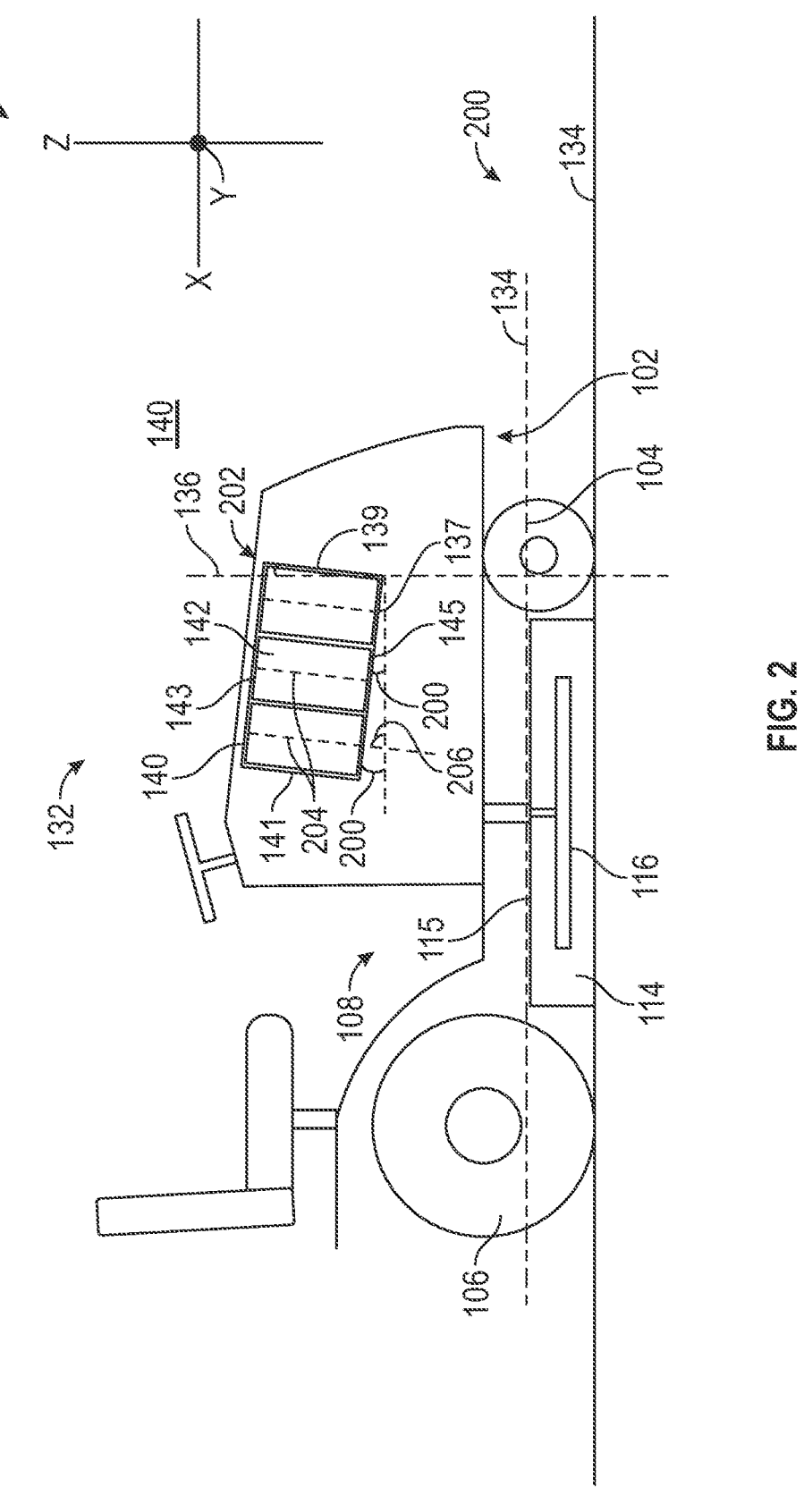
FIG. 2 is a side view of the lawn tractor of FIG. 1.
Figure 3:
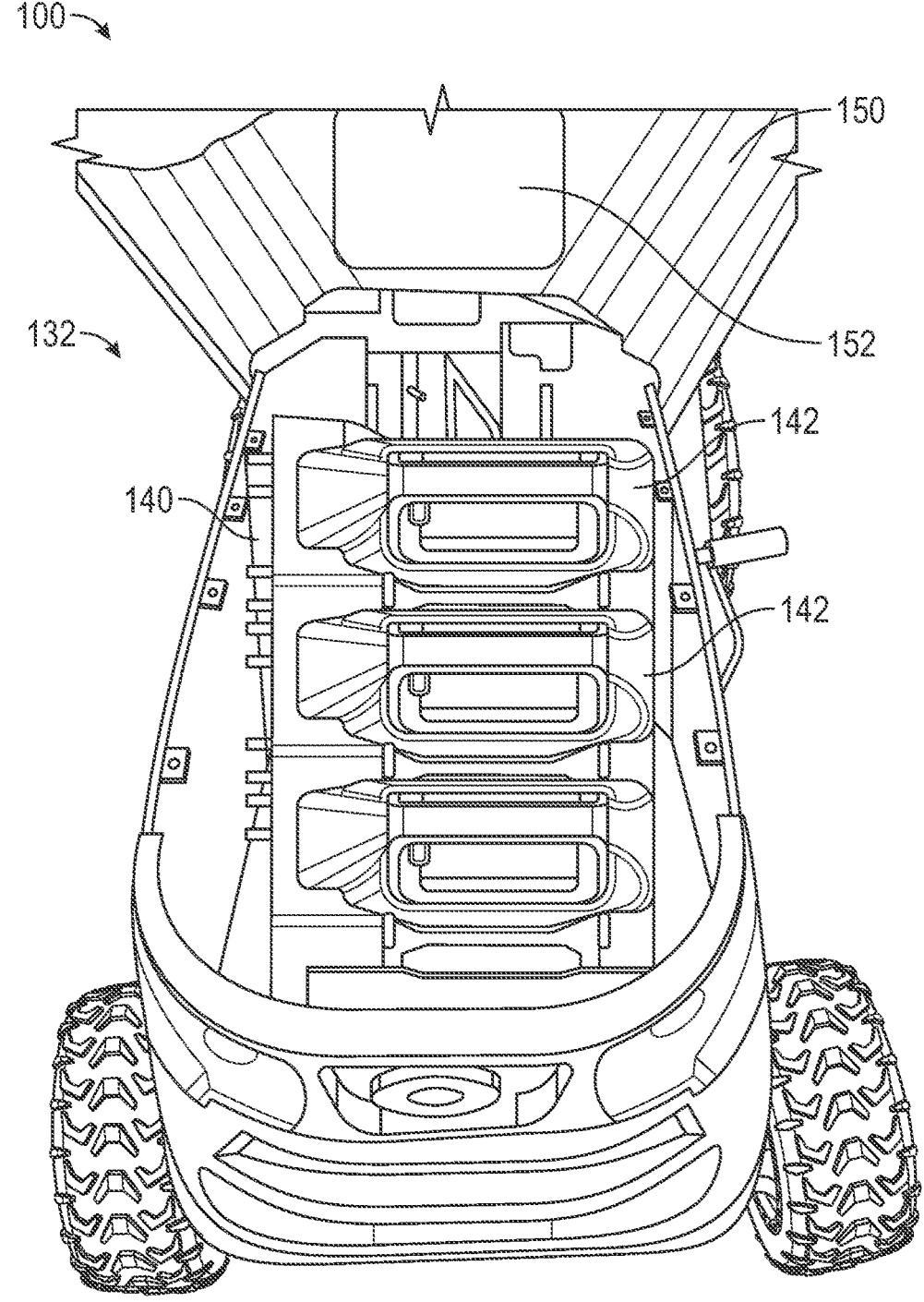
FIG. 3 is a front perspective view of a battery assembly of the lawn tractor of FIG. 1.

Referring now to FIGS. 2-3, views of a piece of outdoor power equipment having a battery assembly are shown, according to an exemplary embodiment. In an exemplary embodiment, the piece of outdoor power equipment is the tractor 100, and the battery assembly is the battery assembly 132 of FIG. 1. The battery assembly 132 is shown to include the receptacle 140 configured to selectively receive a plurality of battery packs 142.

As shown in FIG. 2, the battery assembly 132 is positioned at a front portion of the tractor 100 (e.g., under the hood 150), and is angled at an angle 200 relative to an operating plane 134 defined by the tractor 100. The operating plane 134 is arranged parallel to the X-Y plane. The operating plane 134 may be defined by, or oriented relative to, one or more components of the tractor 100. For example, the operating plane 134 may be defined by and parallel to the chassis 102 or a frame member of the chassis 102. In some embodiments, the operating plane 134 is defined by and arranged parallel to the ground 135 (as shown in at least FIG. 2). In some embodiments, the operating plane 134 is defined by or arranged parallel to a bottom surface of the blade 116 (e.g., defined by a plane the blade 116 cuts along). In the illustrated embodiment, the operating plane 134 is defined along and parallel to a top surface 115 of the mowing assembly 114 (e.g., a top surface of a mowing deck or mowing skirt). Regardless of the particular component that defines the operating plane 134, the battery assembly 132 is arranged at an angle 200 relative to the operating plane 134 so that an operator or user may efficiently install and remove the battery packs 142.

In an exemplary embodiment, an outer wall or outer surface 137 (e.g., a bottom surface from the perspective of FIG. 2, a rear wall, etc.) of the receptacle 140 is angled at the angle 200 relative to the operating plane 134. The angle 200 may be defined by the intersection of a plane that extends parallel to the outer surface 137 and the operating plane 134. In general, the angle 200 tilts or rotates the battery assembly 132 (e.g., the receptacle 140 and the battery packs 142 arranged therein) so that a front end 139 of the battery assembly 132 is arranged closer to the operating plane 134 than a rear end 141 of the battery assembly 132. In some embodiments, the angle 200 may define an acute angle, for example an acute angle that is greater than 0 degrees but less than 90 degrees. In some embodiments, the angle 200 is defined within a range, for example between about (e.g., within 10%) 5 and about 60 degrees, between about 10 and about 50 degrees, or within another suitable range (e.g., about 15 to about 45, about 20 to about 50, about 25 to about 60, about 30 to about 45 or another range of degrees). In an exemplary embodiment, the angle 200 is about 15 degrees; however, in other embodiments, the angle 200 is another suitable angle (e.g., about 2.5, about 5, about 7.5, about 10, about 12.5, about 17.5, about 20, about 22.5, about 25, about 30, about 35, about 40, about 45, about 90 degrees) to facilitate efficient insertion or removal of the battery packs 142. In an exemplary embodiment, the operating plane 134 is defined when the tractor 100 is in a standard (e.g., operating) position (as shown in at least FIGS. 1-2); however, in other embodiments, the operating plane 134 is defined when the tractor 100 is in another position (e.g., stationary, storage, maintenance, or another position).

In an exemplary embodiment, an outer wall or surface of the front end 139 may be angled at an angle 202 relative to an upright plane 136 defined by the tractor 100 (as shown in at least FIG. 2). The upright plane 136 may be arranged parallel to the Y-Z plane. The upright plane 136 may be perpendicular to the operating plane 134, the ground 135, or components of the tractor 100 (e.g., the chassis 102, a frame member of the chassis 102, a bottom surface of the blade 116, etc.). The angle 202 may be defined by the intersection of a plane that extends parallel to the outer wall or surface of the front end 139, and the upright plane 136 (as shown in at least FIG. 2). In an exemplary embodiment, the angle 202 is the same as the angle 200; however, in other embodiments the angle 202 and the angle 200 are different. In an exemplary embodiment, the angle 202 defines an acute angle, for example an acute angle that is greater than 0 degrees but less than 90 degrees. In some embodiments, the angle 202 is defined within a range, for example between about (e.g., within 10%) 5 and about 60 degrees, or another range of degrees (e.g., about 15 to about 45, about 20 to about 50, about 25 to about 60, about 30 to about 45, or another range of degrees). In other embodiments, the angle 202 is another suitable angle (e.g., about 2.5, about 5, about 7.5, about 10, about 12.5, about 17.5, about 20, about 22.5, about 25, about 30, about 35, about 40, about 45, about 90 degrees), for example to facilitate efficient insertion or removal of the battery packs 142.

As shown in FIG. 2, one or more components of the battery assembly 132 is/are angled relative to a plane. In an exemplary embodiment, one or more of the battery packs 142 is/are angled relative to a plane, for example to facilitate efficient insertion or removal of the battery packs 142. The battery pack 142 may include an upper portion 143 and a lower portion 145. The upper portion 143 may include an outer wall or surface, and the lower portion 145 may include an outer wall or surface. The outer wall or surface of the upper portion 143 and the outer wall of surface of the lower portion 145 may be parallel, and may define an axis 204 (e.g., a central axis) that extends between the outer walls or surfaces of the upper portion 143 and the lower portion 145. The axis 204 may be perpendicular to the outer walls or surfaces of the upper portion 143 and the lower portion 145, for example to define a central axis of the battery pack 142 (as shown in at least FIG. 2). In some embodiments, the axis 204 extends from a handle (e.g., of the upper portion 143) to a base (e.g., of the lower portion 145) of the battery pack 142.

In an exemplary embodiment, the outer wall or surface of the lower portion 145 of the battery pack 142 is angled relative to a plane. For example, the outer wall or surface of the lower portion 145 may be angled at the angle 200 relative to the operating plane 134 (as shown in at least FIG. 2). The angle 200 may be defined by the intersection of a plane that extends parallel to the outer wall or surface of the lower portion 145 and the operating plane 134 (as shown in at least FIG. 2). In some embodiments, the outer wall or surface of the lower portion 145 is angled relative to the operating plane at another angle. For example, at an acute angle (e.g., greater than 0 degrees but less than 90 degrees), within a range of degrees (e.g., between about 5 and about 60 degrees, about 15 to about 45, about 20 to about 50, about 25 to about 60, about 30 to about 45, or another range of degrees), or at another suitable angle (e.g., about 2.5, about 5, about 7.5, about 10, about 12.5, about 17.5, about 20, about 22.5, about 25, about 30, about 35, about 40, about 45, about 90 degrees).

In some embodiments, the axis 204 is also angled relative to a plane. For example, the axis 204 may be angled at the angle 206 relative to the operating plane 134 (as shown in at least FIG. 2). The angle 206 may be defined by the intersection the axis 204 and the operating plane 134. The angle 206 may define an acute angle, for example an acute angle that is greater than 0 degrees but less than 90 degrees. In some embodiments, the angle 206 is defined within a range, for example between about 30 and about 85 degrees, or another range of degrees (e.g., about 45 to about 75, about 40 to about 70, about 30 to about 65, about 45 to about 60, or another range of degrees). In other embodiments, the angle 206 is another suitable angle (e.g., about 87.5, about 85, about 82.5, about 80, about 77.5, about 72.5, about 70, about 67.5, about 65, about 60, about 55, about 50, about 45, etc.), for example to facilitate efficient insertion or removal of the battery packs 142 along the axis 204.

In yet other embodiments, other components of the battery packs 142 are angled relative to a plane. For example, a front or rear wall of the battery pack 142 may be angled (e.g., at the angle 202) relative to a plane (e.g., the upright plane 136). The axis 204 of the battery pack may also be angled relative to a plane, for example the axis 204 of the battery pack 142 may be angled relative to the upright plane 136 (e.g., within the X-Z plane as depicted in at least FIG. 2). In other embodiments, one or more components of the receptacle 140, the battery assembly 132, and/or the battery packs 142 (e.g., a top wall, bottom wall, sidewall, etc.) are angled relative to another plane or component of the tractor 100 (e.g., a plane defined by a hood, a plane defined by a transparent surface in a hood, etc.).

As shown in FIGS. 2-3, the battery assembly 132 includes the receptacle 140, which is configured to selectively receive a plurality of battery packs 142. As will be discussed in greater detail below, in an exemplary embodiment the receptacle 140 is configured to receive three battery packs 142. The battery packs 142 may be selectively received (e.g., inserted/removed, etc.) within the receptacle 140 without the use of a tool, and may be configured to power components of the tractor 100 (e.g., the motor 130, the drive assembly 120, the mowing assembly 114, etc.). In an exemplary embodiment, the battery packs 142 are configured to be individually received (e.g., inserted/removed, etc.) within the receptacle 140, so as to ease the installation/replacement processes. Further, in an exemplary embodiment, a single battery pack 142 is configured to provide sufficient power output to power the tractor 100. It should be understood that while the battery assembly 132 is shown as including a receptacle 140 and battery packs 142, the battery assembly 132 may be integrated with of the tractor 100, such that components of the tractor 100 may replace components of the battery assembly 132 (e.g., the receptacle 140, the battery packs 142, etc.).

As shown in FIG. 3, the tractor 100 also includes a cover shown as the hood 150, which is rotatably coupled to a front portion of the tractor 100. In an exemplary embodiment, the hood 150 includes the transparent surface 152 and is coupled to components of the tractor 100 (e.g., the deck assembly 108, the chassis 102, the battery assembly 132, etc.). As discussed briefly above, the hood 150 is configured to rotate between an open position and a closed position. As shown in FIG. 3, when the hood 150 is in an open position, the battery assembly 132 (e.g., the receptacle 140 and/or the battery packs 142) is partially exposed to the outside environment. In this regard, when the hood 150 is in an open position, components of the battery assembly 132 (e.g., the receptacle 140, the battery packs 142, etc.) may be accessible, for example for insertion/removal, inspection, maintenance, etc. Conversely, when the hood 150 is in a closed position, components of the battery assembly 132 are protected or enclosed from the outside environment. In this regard, when the battery assembly 132 is in an installed configuration (e.g., the battery pack 142 is in an installed position within the receptacle 140), the hood 150 may be in a closed position to protect the battery assembly 132 (e.g., from inclement weather, forces, wear and tear, etc.). Further, the transparent surface 152 may be configured to allow components of the tractor 100 (e.g., the battery assembly 132, the battery packs 142, etc.) to be observed when the hood 150 is in a closed position. According to an exemplary embodiment, the hood 150 is configured to completely enclose the battery assembly 132 (e.g., within the tractor 100); however, in other embodiments the hood 150 is configured to partially enclose the battery assembly 132 (e.g., within the tractor 100). It should be understood that while the hood 150 is shown as rotatably coupled to the tractor 100, the hood 150 may be another suitable cover (e.g., door, plate, etc.) and/or another suitable configuration (e.g., sliding, pivoting, hinged, etc.).

Figure 4:
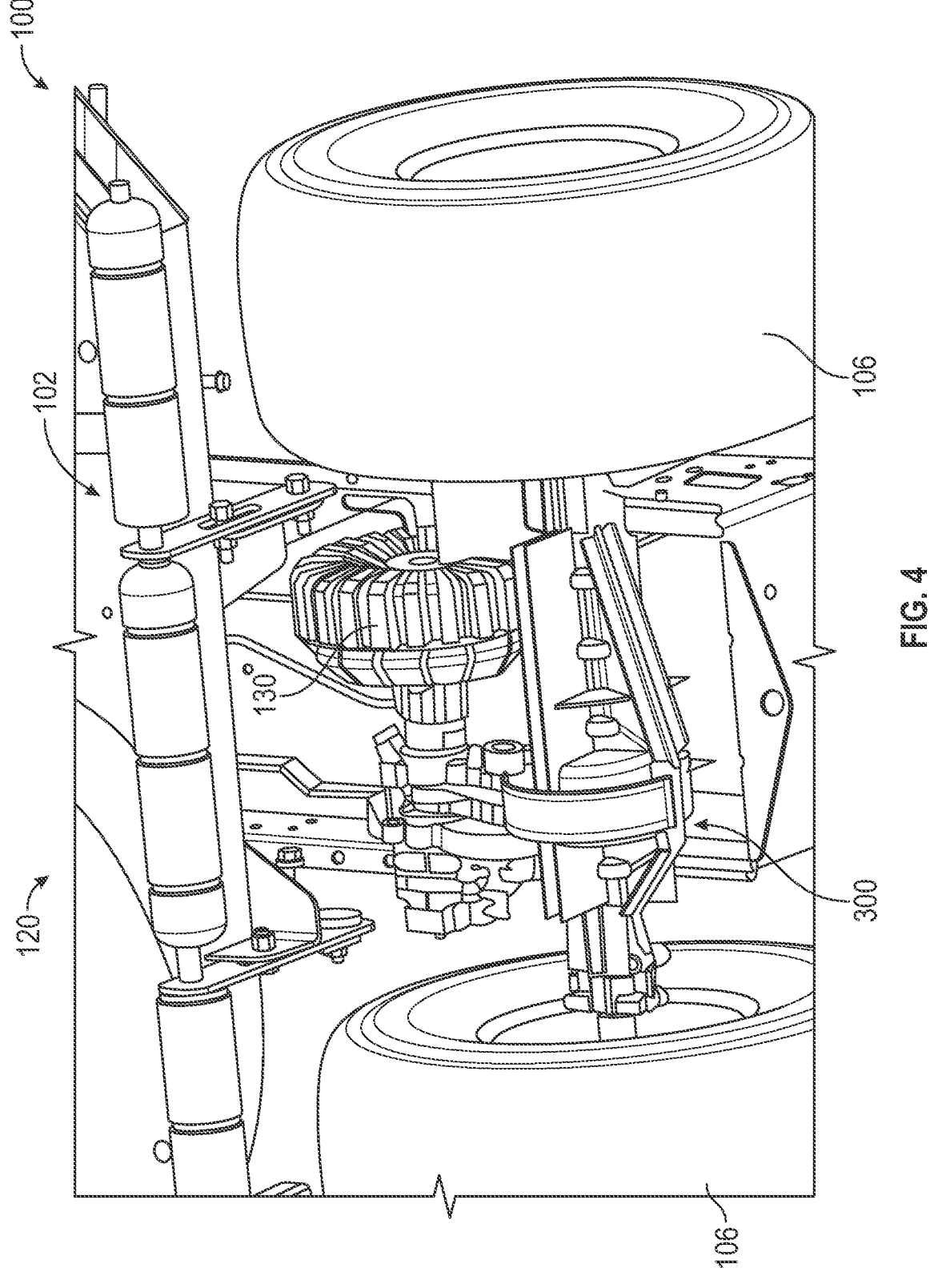
FIG. 4 is a perspective view of a drive assembly of the lawn tractor of FIG. 1.

Referring now to FIG. 4, a portion of a piece of outdoor power equipment having a drive assembly is shown, according to an exemplary embodiment. In an exemplary embodiment, the piece of outdoor power equipment is the tractor 100, and the drive assembly is the drive assembly 120 of FIG. 1. According to an exemplary embodiment, the drive assembly 120 includes a differential 300, which is configured to transfer power from the motor 130 to the rear wheels 106 so as to allow the wheels to rotate a different speeds. In an exemplary embodiment, the drive assembly 120 includes a single differential 300 that is driven (e.g., powered, etc.) by the motor 130. In some embodiments, the differential 300 is positioned at a rear portion of the chassis 102, and is coupled to the rear wheels 106. In other embodiments, the differential 300 is positioned at a front portion of the chassis 102, and is coupled to the front wheels 104.

According to an exemplary embodiment, the drive assembly 120 further includes a drive shaft coupled to the motor 130, which is configured to deliver (e.g., transfer, etc.) force (e.g., torque) from the motor 130 to the differential 300. The differential 300 may also include additional, fewer, and/or different components configured to transfer force from components of the drive assembly 120 (e.g., the drive shaft, the motor 130, etc.) to the wheels. For example, the differential 300 may include a pinion gear that is configured to receive force from the drive shaft. The pinion gear may be coupled to a ring gear, and may be configured to manipulate (e.g., rotate) the ring gear. In an exemplary embodiment, the ring gear may has a larger diameter than the pinion gear, so as to produce a gear reduction. The ring gear may further be coupled to a differential case, and the ring gear may be configured to rotate the differential case as the ring gear rotates. In an exemplary embodiment, the differential 300 also includes a sun gear (or a plurality of sun gears), which is/are coupled to the differential case. The sun gear(s) may further be coupled to an axle (or axles), which may be configured to transfer force from the differential 300 to the wheels. In this regard, as the differential 300 receives a force from the drive shaft, the pinion gear may rotate the ring gear, which may rotate the differential case, which may rotate the sun gear(s), which may rotate the axle(s), thereby transferring force (e.g., torque) from the drive assembly 120 to the wheels (e.g., the rear wheels 106). It should be understood that while the differential 300 is described herein as having various components, the differential 300 may include additional, fewer, and/or different working components.

Figure 5:
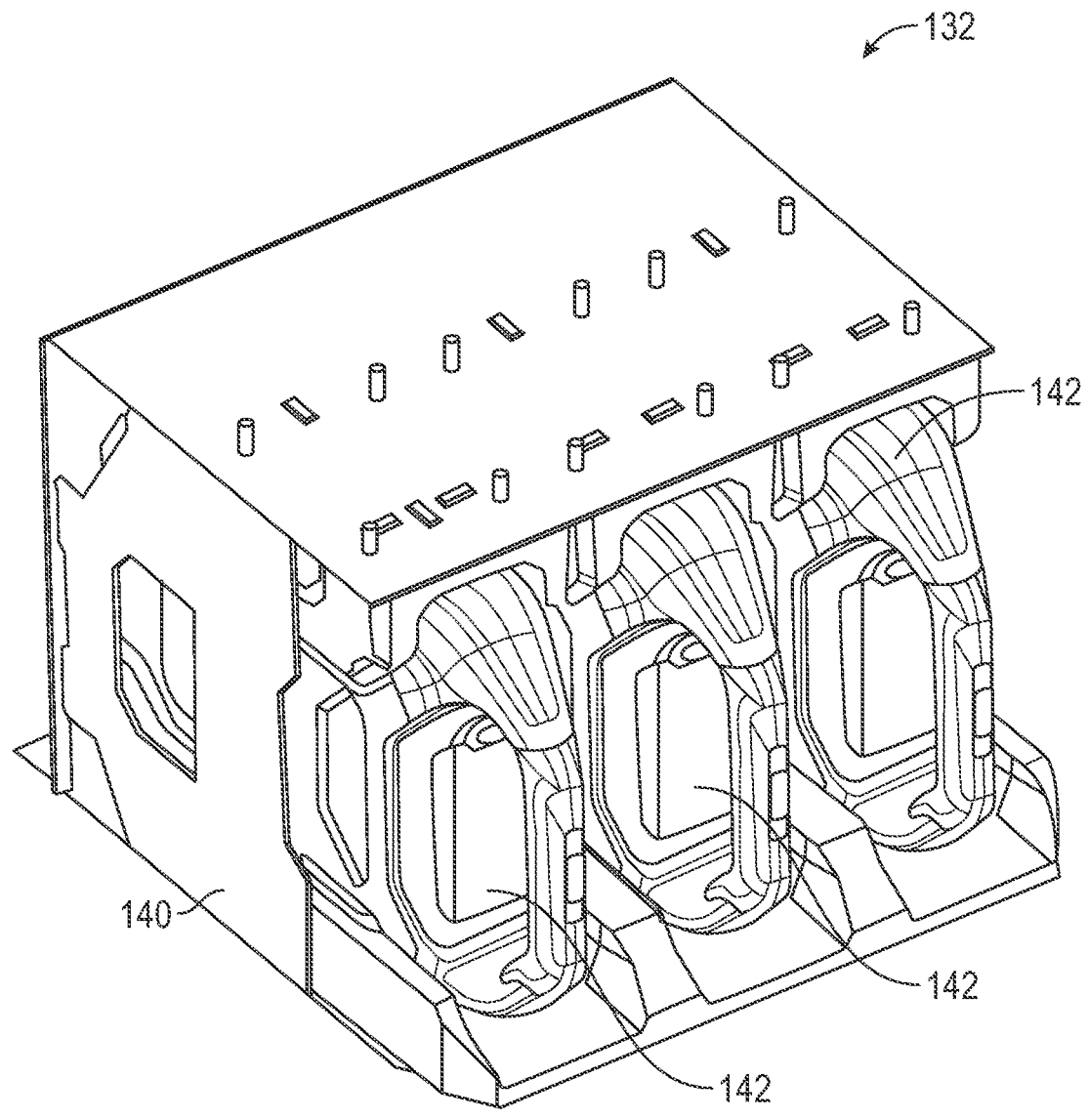
FIG. 5 is a perspective view of a portion of the battery assembly of FIG. 3.

Referring now to FIG. 5, a battery assembly of a piece of power equipment is shown, according to an exemplary embodiment. In an exemplary embodiment, the battery assembly is the battery assembly 132 of FIGS. 1-3, which is integrated with the tractor 100. It should be understood that while the battery assembly 132 is disclosed herein as being integrated with the tractor 100, the battery assembly 132 may be integrated with another piece of outdoor power equipment, integrated with a charging station, and/or may be independent and selectively coupled (e.g., installed/removed via attachments, electrically via a power cord, etc.) to a piece of equipment and/or a charging station in order to transfer/receive power.

As discussed above, the battery assembly 132 includes the receptacle 140, which is configured to selectively receive a plurality of battery packs 142. According to an exemplary embodiment, the battery assembly 132 is configured to have an installed configuration (e.g., when a battery pack 142 is installed within a portion of the receptacle 140), and/or an uninstalled configuration (e.g., when a portion of the receptacle 140 does not include a battery pack 142). In the installed configuration, the battery assembly 132 (e.g., the battery pack 142) may be configured to power components of the tractor 100. In the uninstalled configuration, the battery assembly 132 (e.g., the receptacle 140) may be configured to receive a battery pack 142 (e.g., a replacement battery pack, etc.). In an exemplary embodiment, the battery assembly 132 is configured to be in both an installed configuration and an uninstalled configuration. For example, the receptacle 140 may include a battery pack 142 in a first portion of the receptacle 140 (e.g., a first bay), and the receptacle 140 may not include a battery pack 142 in a second portion of the receptacle 140 (e.g., a second bay). In this regard, the battery assembly 132 (e.g., the receptacle 140) may be configured to receive the battery packs 142 individually and/or independently, so as to selectively install/replace the battery packs 142 as needed.

As shown in FIG. 4, in an exemplary embodiment the receptacle 140 is configured to receive three battery packs 142. In some embodiments, the receptacle 140 is configured to receive another suitable number of battery packs 142 (e.g., 1, 2, 4, 5, 10, 15, 20, 25, etc.). According to an exemplary embodiment, the battery packs 142 are removable and rechargeable. In this regard, the battery packs 142 may be of a manageable size (e.g., height, width, weight, etc.), such that a user and/or operator can easily lift, carry, install, remove, etc. the battery pack 142. As will be discussed in greater detail below, in an exemplary embodiment the battery pack 142 includes a Lithium-ion battery that provides about one kilowatt-hour of energy, and weighs less than about thirty pounds.

Figure 6:
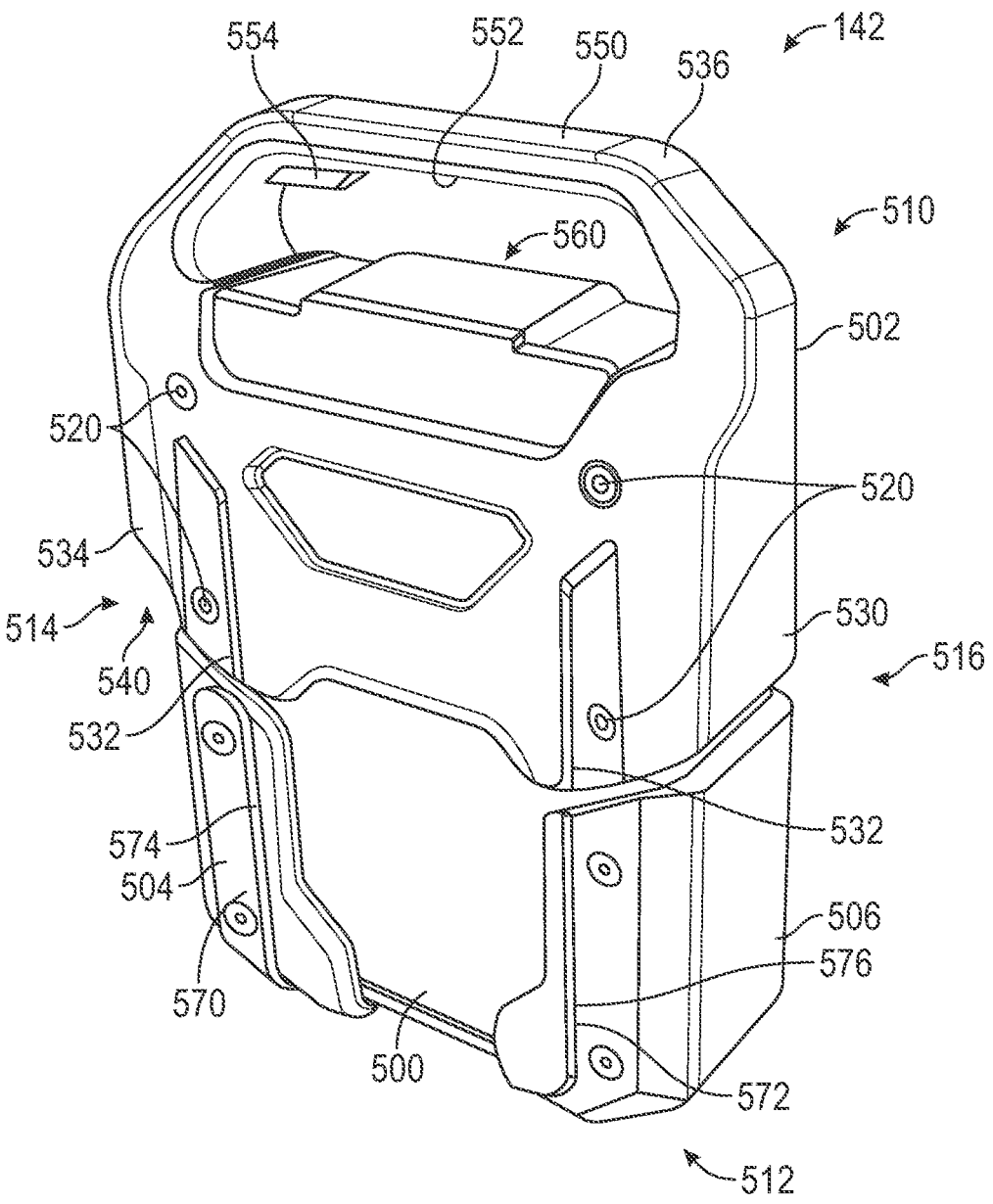
FIG. 6 is a rear perspective view of a battery pack for use with the battery assembly of FIG. 3, according to an exemplary embodiment.
Figure 7:
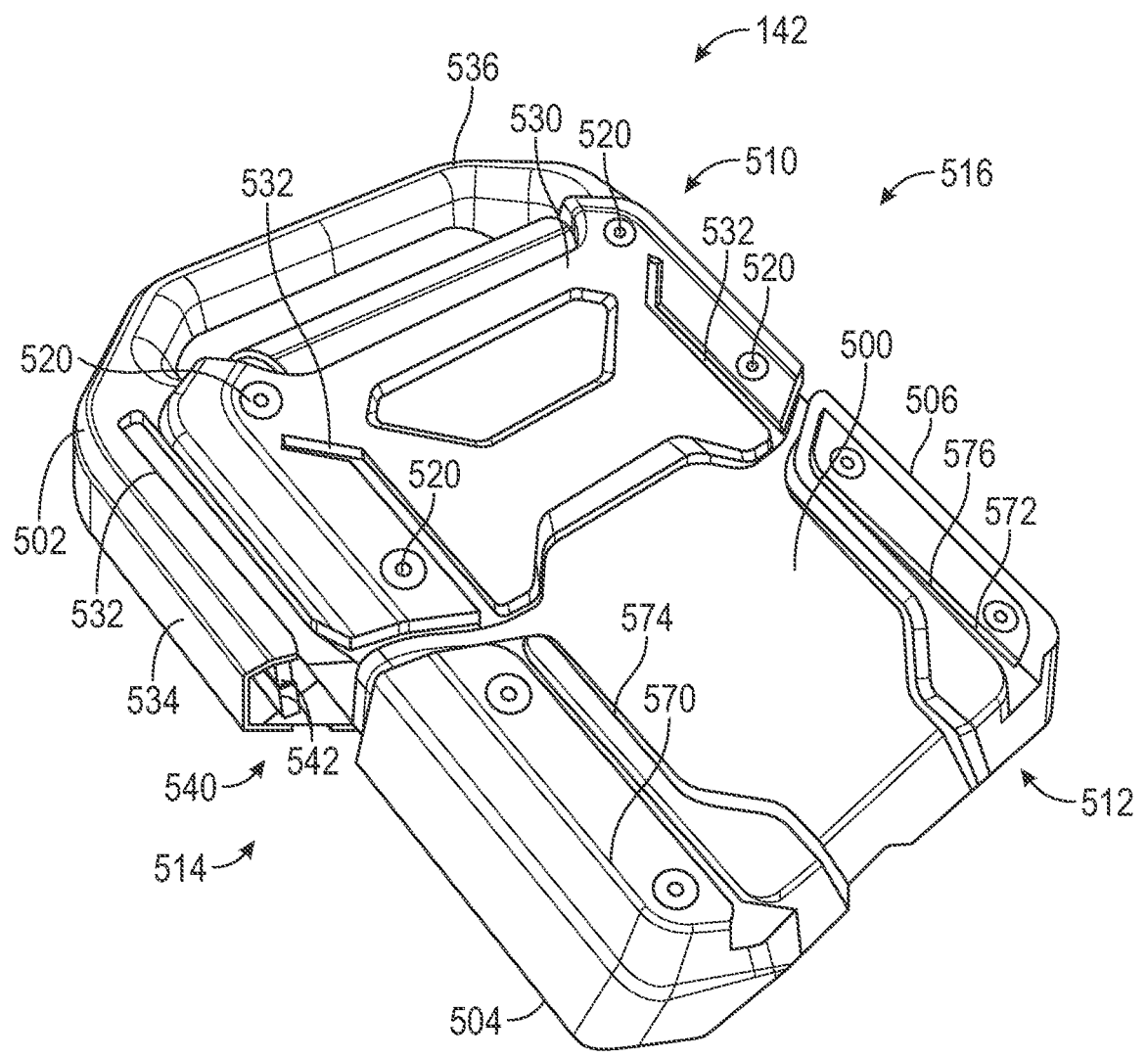
FIG. 7 is a side perspective view of the battery pack of FIG. 6.

Referring now to FIGS. 6-7, a battery pack is shown, according to an exemplary embodiment. In an exemplary embodiment, the battery pack is the battery pack 142 of FIGS. 1-3, and is configured to power components of the tractor 100. The battery pack 142 may be removable and rechargeable, and may be configured to be inserted into/removed from (e.g., dropped, lowered, raised, placed, positioned, slid, etc.) the receptacle 140 of the battery assembly 132. As discussed above, in an exemplary embodiment the battery pack 142 is installed into/removed from the receptacle 140 at an angle relative to a plane when the tractor 100 is in an operating position. For example, the battery pack 142 may be installed into/removed at the angle 200 relative to the operating plane 134 (e.g., into the receptacle 140, the battery assembly 132, or other components of the tractor 100), for example to facilitate insertion or removal of the battery pack 142. However, in some embodiments the battery pack 142 is installed/removed vertically, horizontally, and/or in another suitable direction (rotated, twisted, etc.).

According to an exemplary embodiment, the battery pack 142 yields a voltage of approximately 48 Volts (V) and 1,400 Watt-hours (Wh) of energy, and/or has a capacity of at least 300 Wh. The battery pack 142 may have a total weight of less than approximately twenty pounds; thus, allowing for ease of portability, installation, removal, and/or replacement. As will be discussed in greater detail below, the battery pack 142 may be installed/removed by an operator to/from components of the tractor 100 without the use of tools. In an exemplary embodiment, the battery pack 142 is hot-swappable (i.e., a drained battery pack 142 may be exchanged for a new battery pack 142 without completely powering down the tractor 100); thus, eliminating the downtime between battery pack 142 exchanges. The battery pack 142 may be configured to be used in conjunction with a plurality of battery packs 142 (e.g., 2, 3, 4, 5, 10, 25, 50, etc.), or used individually. In this regard, a single battery pack 142, or a plurality of battery packs 142, may be configured to power (e.g., drive) components of the tractor 100. While the battery pack 142 is described herein as yielding certain voltages, having certain capacities, a certain weight, etc. it should be understood that the battery pack 142 may have other yields, capacities, weights, and/or other characteristics.

As shown in FIGS. 6-7, the battery pack 142 includes a battery 500, an upper modular portion 502, and lower modular portions 504, 506 (e.g., first lower modular portion, second lower modular portion, etc.). In an exemplary embodiment, the battery 500 is a Lithium-ion battery; however, in other embodiments, the battery 500 is another type of battery (e.g., nickel-cadmium (NiCD), lead-acid, nickel-metal hydride (NiMH), lithium polymer, etc.). The battery 500 may comprise multiple cells (e.g., Lithium-ion cells) arranged in a variety of series(S) and parallel (P) configurations. For example, in one configuration the battery 500 includes seventy-eight cells, with each cell being rated at 3.6 volts and 2.5 amp-hours. In an exemplary embodiment, the battery 500 arranges the cells in a 13S6P configuration, with 13 cells connected in series in a group, and 6 groups of cells connected in parallel. The series configuration may yield a system voltage of 46.8 volts for the battery 500, and the parallel configuration may yield 15 amp-hours capacity for the battery 500. In some embodiments, the battery 500 has cells that are arranged in a single layer (e.g., 6 groups of 13 cells in a single layer). In other embodiments, the battery 500 has cells that are arranged in multiple layers. For example, the battery 500 may have a 13S6P configuration and may include two layers of cells, with each layer arranging the cells in 6 groups. In yet other embodiments, the battery 500 includes another suitable number of cells (e.g., 84, 100, etc.) in other suitable configurations (e.g., 14S6P, 20S5P, etc.), which are rated at another suitable rating (e.g., 2.5 amp-hours, 2.9 amp-hours, 3.2 amp-hours, etc.).

The battery 500 is shown to include an upper portion 510, a lower portion 512, a left side 514, and a right side 516. The upper modular portion 502 may be coupled to the upper portion 510 of the battery 500, and the lower modular portions 504, 506 may be coupled to the lower portion 512 of the battery 500 on the left side 514 and the right side 516, respectively. In an exemplary embodiment, the upper modular portion 502 and/or the lower modular portions 504, 506 are coupled to the battery 500 via fasteners 520 (e.g., bolts, screws, nuts, etc.); however, in other embodiments the modular portions 502, 504, and/or 506 are coupled to the battery 500 via another suitable fastening mechanism (e.g., molded, welded, etc.). The upper modular portion 502 and/or the lower modular portions 504, 506 may be formed of a suitable polymer and may be configured to provide protection to the battery 500 (e.g., from inclement weather, from forces via dropping, from wear and tear, etc.). While the upper modular portion 502 and the lower modular portions 504, 506 are shown as separate components, in some embodiments the upper modular portion 502 and/or the lower modular portions 504, 506 are a unified component (e.g., a single modular portion). In other embodiments, the battery pack 142 does not include the upper modular portion 502 and/or the lower modular portions 504, 506. In this regard, the upper modular portion 502 and/or the lower modular portions 504, 506 may be configured to be mounted (e.g., permanently, temporarily, etc.) to components of the tractor 100 (e.g., the receptacle 140, etc.). In yet other embodiments, the battery pack 142 includes additional, fewer, and/or different working components, as will be discussed below.

As shown in FIGS. 6-7, the upper modular portion 502 includes a casing 530, at least one guide, shown as slots 532, a mating portion 534, and a handle 536. The casing 530 is shown to surround the upper portion 510 of the battery 500, and is configured to provide protection to the battery 500. The slots 532 are shown to extend (e.g., vertically, etc.) along the upper modular portion 502, and are positioned proximate to the left side 514 and the right side 516 of the battery 500 (e.g., on the casing 530, the mating portion 534, etc.). The slots 532 may be configured to guide the battery pack 142 into/out of a piece of equipment (e.g., the receptacle 140 of the tractor 100), as described herein. While the upper modular portion 502 includes at least one guide shown as slots 532, it should be understood that the upper modular portion 502 may include any suitable guide (e.g., a projection, a bumper, a chamfer edge, a bevel edge, a groove, etc.), and/or any suitable number of guides (e.g., 0, 1, 2, 5, 10, etc.).

In an exemplary embodiment, the mating portion 534 includes an aperture 540 having one or more pack connectors (e.g., shown as ports 542 in FIG. 7), which are configured to selectively and electrically couple/de-couple (e.g., mate, engage, etc.) one or more connectors, as discussed below. The mating portion 534 is shown to be positioned proximate to the left side 514 of the battery 500; however, in other embodiments the mating portion 534 is positioned at another portion of the battery 500 (e.g., a middle portion of a first surface, a center portion of a rear surface, the right side 516, etc.). The handle 536 is shown to be positioned at a top portion of the upper modular portion 502, and extends away from the upper modular portion 502. In an exemplary embodiment, the handle 536 includes an outer surface 550 and an inner surface 552, which a user may engage (e.g., grab, hold, etc.) to selectively move, reposition, insert/remove, etc. the battery pack 142. The handle 536 may further include a release mechanism, shown as button 554, which may be positioned at the inner surface 552 of the handle 536. In an exemplary embodiment, the button 554 is movable (e.g., can be depressed, pressed, released, etc.), and is configured to lock/unlock the battery pack 142 to/from a piece of equipment (e.g., the receptacle 140 of the tractor 100) and/or a charging station. In this regard, a user may grasp the handle 536, and easily move the button 554 so as to lock/unlock (e.g., engage/disengage, etc.) the battery pack 142 to/from the receptacle 140 of the tractor 100.

As shown in FIGS. 6-7, the lower modular portions 504 and 506 also include a casing, shown as casings 570, 572, and a guide, shown as slots 574, 576. The casing 570 is shown to surround the lower portion 512 of the battery 500 on the left side 514, and the casing 572 is shown to surround the lower portion 512 of the battery 500 on the right side. Similar to the casing 530 discussed above, casings 570 and 572 may be configured to provide protection to the battery 500. The slots 574 and 576 are shown to extend (e.g., vertically, etc.) along the lower modular portions 504 and 506 (respectively), and are positioned proximate to the left side 514 and the right side 516 of the battery 500 (respectively). According to the exemplary embodiment shown in FIGS. 6-7, the slot(s) 574 and/or 576 of the lower module portion(s) 504 and/or 506 are aligned with the slot(s) 532 of the upper module portion. In this regard, when the slot(s) 574 and/or 576 are aligned with the slot(s) 532, a guide may extend (e.g., vertically, etc.) along the length of the battery 500 (e.g., the lower modular portion(s) 504 and/or 506 and the upper modular portion 502, the battery pack 142, etc.). Similar to the slots 532 discussed above, the slots 574 and 574 may be configured to guide the battery pack 142 into/out of a piece of equipment (e.g., the receptacle 140 of the tractor 100) and/or a charging station. Although the lower modular portions 504 and 506 are shown to include a guide shown as slots 574 and 576, it should be understood that the lower modular portions 504 and/or 506 may include any suitable guide (e.g., a projection, a bumper, a chamfer edge, a bevel edge, a groove, etc.), and/or any suitable number of guides (e.g., 0, 1, 2, 5, 10, etc.).

As shown in FIGS. 6-7, the battery pack 142 also includes an indicator, shown as interface 560, which is configured to relay information relating to the battery pack 142. The interface 560 may include light-emitting diodes (LEDs), a liquid crystal display (LCD display), and/or any other suitable visual display components. In an exemplary embodiment, the interface 560 is configured to provide indicators (e.g., colors, blinks, flashes, etc.) relating to various fault conditions of the battery pack 142. In some embodiments, the interface 560 is also configured to provide other information relating to the battery pack 142, for example, charge status, battery health, battery life, battery mode, a battery identifier, a link system, etc. As shown in FIGS. 6-7, the interface 560 is positioned at a top portion of the upper modular portion 502; however, in other embodiments, the interface 560 is positioned at another suitable location on the battery pack 142 (e.g., at the upper modular portion 502 proximate to the left side 514, the right side 516, etc., at the lower modular portion 504 and/or 506, etc.). While the interface 560 is shown to relay information via a visual display, it should be understood that the interface 560 may be configured to relay information via another suitable indicator device/configuration (e.g., audio, tactile, etc.).

Referring now to FIG. 7, the mating portion 534 is shown to include one or more pack connectors, shown as ports 542, which is/are configured to selectively and electrically couple/de-couple one or more power connectors, according to an exemplary embodiment. In an exemplary embodiment, the ports 542 are accessible through the mating portion 534 of the upper modular portion 502. In this regard, the upper modular portion 502 (and/or the mating portion 534) may be configured to protect the ports 542 from damage (e.g., during installment, removal, from inclement weather, forces, etc.). As will be discussed in greater detail below, the ports 542 may be configured to selectively and electrically couple/de-couple power connectors of a piece of equipment (e.g., the receptacle 140 of the tractor 100) and/or a charging station. In this regard, the ports 542 may be configured to couple power connectors so as to permit the battery pack 142 to transfer/receive power to/from the tractor 100 and/or a charging station. As shown in FIG. 7, the mating portion 534 also includes a guide, shown as slot 532, which is configured to aid in guiding and/or positioning the mating portion 534 and/or the battery pack 142. While the ports 542 are shown as male adapters, it should be understood that the ports 542 may be any other suitable connector (e.g., plug, socket, jack, dock connector, edge connector, etc.) configured to allow the battery pack 142 to transfer/receive power to/from the tractor 100 and/or a charging station.

Figure 8:
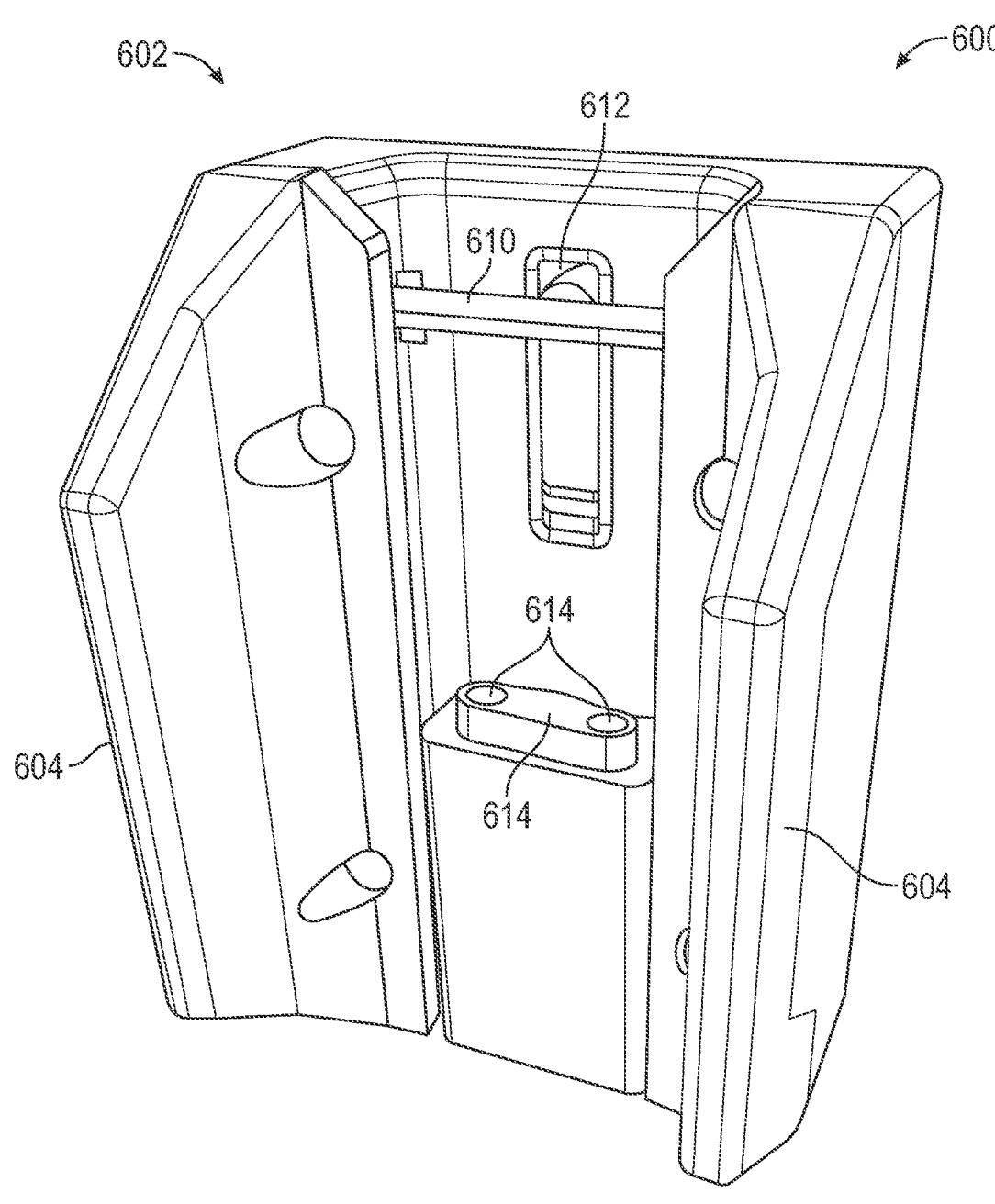
FIG. 8 is a perspective view of a portion of a receptacle for use with the battery pack of FIG. 6, according to an exemplary embodiment.

Referring now to FIG. 8, a dock 600 is provided, according to an exemplary embodiment. In an exemplary embodiment, the dock 600 is integrated with the receptacle 140 of the tractor 100, and is configured to selectively and electrically couple the battery pack 142. In an exemplary embodiment, the dock 600 is configured to couple a single battery pack 142; however, in other embodiments, the dock 600 is configured to couple a plurality of battery packs 142 (e.g., 2, 4, 5, etc.). As will be discussed in greater detail below, the dock 600 may be configured to couple/de-couple the battery pack 142, so as to permit the tractor 100 and/or a charging station to receive/transfer power from/to the battery pack 142.

As shown in FIG. 8, the dock 600 includes a receiving portion 602 and at least one guide, shown as edge 604. In an exemplary embodiment, the receiving portion 602 is configured to receive (e.g., engage, house, support, etc.) components of the battery pack 142, such that the components of the dock 600 may selectively couple/de-couple the battery pack 142. Further, the edges 604 may be configured to aid in guiding and/or positioning the battery pack 142 relative to the receiving portion 602. In some embodiments, the dock 600 includes additional guides (e.g., projections, edges, surfaces), which are configured to engage components of the battery pack 142 (e.g., the slot 574 of the lower modular portion 504, the slot 532 of the upper modular portion 502 and/or the mating portion 534, etc.) so as to guide and/or position the battery pack 142 relative to the receiving portion 602. According to an exemplary embodiment, as the edges 604 guide the battery pack 142 to the receiving portion 602, the receiving portion 602 receives the lower modular portion 504, the mating portion 534, and/or the upper modular portion 502 of the battery pack 142 (e.g., the left side 514 of the battery 500, etc.). In some embodiments, the receiving portion 602 receives another portion of the battery pack 142, for example a middle portion of a surface of the battery pack 142, a middle portion of the upper modular portion 502, a middle portion of the battery 500, etc. While the receiving portion 602 is shown as an indent between the edges 604, it should be understood that the receiving portion 602 may be any other suitable receiver (e.g., a surface, a projection, an edge, etc.) configured to receive the battery pack 142. Further, it should be understood that edges 604 may be any other suitable guide (e.g., a projection, a bumper, a chamfer edge, a bevel edge, a groove, etc.) configured to aid in guiding the battery pack 142 relative to the receiving portion 602.

As shown in FIG. 8, the dock 600 also includes an embrace shown as bar 610 and a movable member shown as latch 612. According to an exemplary embodiment, the bar 610 is positioned at a top portion of the dock 600 (e.g., the receiving portion 602), and is configured to couple/de-couple components of the battery pack 142. The latch 612 may also be positioned at a top portion of the dock 600 (e.g., the receiving portion 602) proximate to the bar 610, and may be configured to couple/de-couple (e.g., lock/unlock, hook/unhook, etc.) components of the battery pack 142. According to an exemplary embodiment, as the battery pack 142 is moved to the dock 600 (e.g., the receiving portion 602, etc.), the bar 610 engages the upper modular portion 502 and/or the mating portion 534, such that the battery pack 142 is positioned proximate to the latch 612. The latch 612 may then couple (e.g., lock, hook, etc.) the upper modular portion 502 and/or the mating portion 534 of the battery pack 142, so as to selectively couple the battery pack 142 to the dock 600. According to an exemplary embodiment, the bar 610 and/or the latch 612 are configured to selectively couple/de-couple the upper modular portion 502 and/or the mating portion 534 of the battery pack 142 (e.g., the left side 514 of the battery 500); however, in other embodiments the bar 610 and/or the latch 612 are configured to couple/de-couple another portion of the battery pack 142 (e.g., a middle portion of a surface of the battery pack 142, the upper modular portion 502, the battery 500, etc.). Further, in some embodiments, components of the battery pack 142 (e.g., the button 554, etc.) may be manipulated so as to aid in the bar 610 and/or the latch 612 selectively coupling/de-coupling the battery pack 142 (e.g., lock/unlock, engage/release, hook/unhook, etc.). While the bar 610 is shown as a horizontal bar, it should be understood that the bar 610 may be any other suitable embrace (e.g., a block, projection, surface, edge, etc.) configured to engage the battery pack 142. Further, it should also be understood that the latch 612 may be another suitable coupling mechanism (e.g., hook, pin, projection, etc.) configured to selectively couple/de-couple the battery pack 142 with the dock 600.

As shown in FIG. 8, the dock 600 further includes a power connector 614. According to an exemplary embodiment, the power connector 614 is positioned in a middle portion of the dock 600 (e.g., the receiving portion 602), and is configured to selectively and electrically couple/de-couple components of the battery pack 142 (e.g., the ports 542), so as to receive/transfer power from/to the battery pack 142. According to an exemplary embodiment, the power connector 614 includes an electrical connector and male connectors, and is configured to electrically couple the ports 542 of the battery pack 142. In this regard, as the battery pack 142 is moved to the dock 600 (e.g., the receiving portion 602, etc.), the bar 610 and/or the latch 612 may couple components of the battery pack 142, and the power connector 614 may electrically couple the ports 542 of the battery pack 142 in an installed position. Conversely, as the battery pack 142 is moved away from the dock 600, the bar and/or the latch 612 may de-couple components of the battery pack 142, and the power connector 614 may electrically de-couple the ports 542 of the battery pack 142 in an uninstalled position. As discussed above, in the installed position the battery pack 142 may be configured to transfer power to the dock 600, so as to provide power to components of the tractor 100. Conversely, in the uninstalled position, the dock 600 may be configured to receive a different battery pack 142 (e.g., a replacement battery pack, etc.). As discussed above with regard to the ports 542, in some embodiments the power connector 614 is another suitable connector (e.g., plug, socket, jack, dock connector, edge connector, etc.) configured to selectively and electrically couple the ports 542. Further, although the power connector 614 is shown to include an electrical connector and male connectors, it should be understood that the power connector 614 may include additional, fewer, and/or different working components (e.g., female connectors, board-to-board connectors, etc.).

Figure 9:
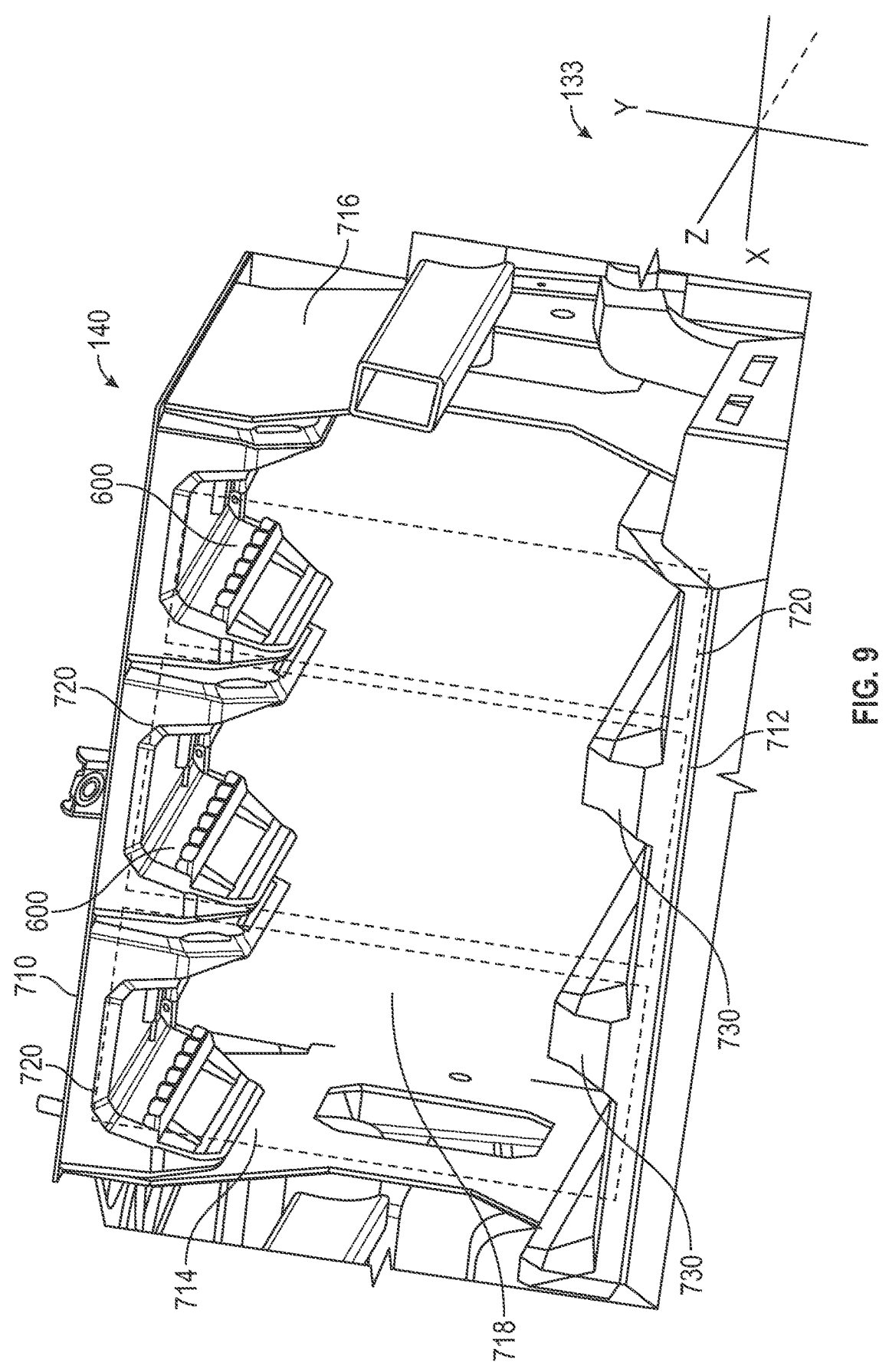
FIG. 9 is a perspective view of a receptacle of the battery assembly of FIG. 3, according to an exemplary embodiment.

Referring now to FIG. 9, a receptacle is shown, according to an exemplary embodiment. In an exemplary embodiment, the receptacle is receptacle 140 of FIGS. 1-3. According to an exemplary embodiment, the receptacle 140 is integrated with the tractor 100, and is configured to receive power from a plurality of battery packs (e.g., the battery packs 142) and/or provide power to components of the tractor 100. As discussed above, in an exemplary embodiment the receptacle 140 (e.g., of the battery assembly 132) is angled relative to a plane. For example, the receptacle 140 may be angled at the angle 200 relative to the operating plane 134, and/or the angle 202 relative to the upright plane 136, when the tractor 100 is in an operating position (as depicted in at least FIG. 2).

As shown in FIG. 9, the receptacle 140 is defined by a top wall 710, a bottom wall 712, a first sidewall 714, a second sidewall 716, and a rear wall 718. The top wall 710, bottom wall 712, first sidewall 714, and second sidewall 716 may be coupled to top, bottom, first side, and second side edges of the rear wall 718, respectively. In some embodiments, the rear wall 718 of the receptacle 140 of the exemplary embodiment of FIG. 9 is or includes the outer wall or outer surface 137 of the receptacle 140 of the exemplary embodiment of FIG. 2. In other embodiments, the first sidewall 714 and the second sidewall 716 of the receptacle 140 of the exemplary embodiment of FIG. 9 are or include the outer wall or surface of the front end 139 and the outer wall or surface of the rear end 141 of the receptacle 140 of the exemplary embodiment of FIG. 2, respectively. In other embodiments, the top wall 710, bottom wall 712, first sidewall 714, second sidewall 716, and the rear wall 718 of the receptacle 140 of the exemplary embodiment of FIG. 9 are or include other components of the receptacle 140 of exemplary embodiment of FIG. 2 (e.g., the outer surface 137, a wall or surface of the front end 139 or the rear end 141, etc.).

In an exemplary embodiment, the top wall 710 is substantially parallel with the bottom wall 712, the first sidewall 714 is substantially parallel with the second sidewall 716, and the top wall 710 and the bottom wall 712 are substantially perpendicular to the first sidewall 714 and the second sidewall 716. Although the receptacle 140 is shown to be substantially rectangular, it should be understood that the receptacle 140 may be any other suitable shape (e.g., square, etc.), and/or the walls 710-718 may be any other suitable configuration (e.g., angled, non-parallel, etc.). According to an exemplary embodiment, the rear wall 718 is angled at the angle 200 relative to the operating plane 134 (as shown in at least FIG. 2). In some embodiments, another wall (e.g., the top wall 710, the bottom wall 712, the first sidewall 714, the second sidewall 716, etc.) is/are angled at angle 200 relative to the operating plane 134.

In an exemplary embodiment, the receptacle 140 is also defined by a cover (e.g., the hood 150 of FIGS. 1 and 3). The hood 150 may be coupled to components of the receptacle 140 (e.g., the second sidewall 716, the first sidewall 714, etc.) and/or components of the tractor 100 (e.g., the chassis 102), and may oppose the rear wall 718. As discussed above, the hood 150 is configured to selectively rotate between an open position and a closed position. When hood 150 is in an open position, the receptacle 140 is defined by the walls 710-718 and is partially exposed on one side (e.g., the side where the hood 150 is positioned). Conversely, when hood 150 is in a closed position, the receptacle 140 may be defined by the walls 710-718 and the hood 150, and the receptacle 140 is walled (or partially walled) on all sides. In this regard, the receptacle 140 may be defined by components (e.g., walls 710-718, hood 150, etc.) that permit the receptacle 140 to selectively and/or partially enclose components (e.g., the battery packs 142, etc.) of the tractor 100.

As shown in FIG. 9, the receptacle 140 also includes a plurality of bays 720, which are configured to receive a plurality of battery packs (e.g., the battery packs 142). The bays 720 may be defined at a rear portion by the rear wall 718, at a top portion by the top wall 710, and/or at bottom portion by the bottom wall 712. In some embodiments, the bays 720 are defined at a side portion by the first sidewall 714 and/or the second sidewall 716. In other embodiments, the bays 720 are not defined at a side portion by a wall; rather, the bays 720 are open at a side portion. In yet other embodiments, the bays 720 are defined by another wall (e.g., a dividing wall, a middle wall, a front wall, etc.), and/or not defined at another portion (e.g., a top portion, bottom portion, rear portion, front portion, etc.). According to an exemplary embodiment, the receptacle 140 includes three bays 720, and each bay 720 is configured to receive a battery pack 142; however, in other embodiments the receptacle 140 includes any suitable number of bays 720 (e.g., 1, 2, 4, 10, 15, etc.), and/or each bay 720 is configured to receive any suitable number of battery packs 142 (e.g., 2, 3, 4, 5, etc.).

As shown in FIG. 9, each bay 720 includes at least one receiver, shown as projection 730. According to an exemplary embodiment, the projection 730 is positioned at a bottom portion of the bay 720, and the projection 730 extends away from the bottom wall 712. In an exemplary embodiment, the projection 730 is configured to aid in guiding and/or positioning the battery pack 142 within the bay 720 (e.g., during installation, removal, etc.). For example, as the battery pack 142 is moved into/out of the bay 720, the projection 730 may engage/disengage components of the battery pack 142 (e.g., the slot 576 of the lower modular portion 506, the slot 532 of the upper modular portion 502, both slots 576 and 532, etc.) so as to guide and/or position the battery pack 142 within the bay 720. In an exemplary embodiment, the projection 730 is a dovetail shaped projection and is configured to engage the slots 532 and/or 576; however, in other embodiments the projection 730 is another suitable projection. As shown in FIG. 9, the projection 730 may traverse a plurality of bays 720 (e.g., a first side of the projection 730 positioned within a first bay 720, a second side of the projection 730 positioned in a second bay 720, etc.). In this regard, the projection 730 may be configured to engage/disengage components of a plurality of battery packs 142, so as to guide and/or position a plurality of battery packs 142 within the receptacle 140. In some embodiments, the bay 720 includes a plurality of projections 730, which are also positioned at a top portion of the bay 720, and extend away from the top wall 710. In this regard, the projections 730 positioned at the top portion of the bay 720 may be configured to engage/disengage other components of the battery pack 142 (e.g., the slot 574 of the lower modular portion 504, the slot 532 of the upper modular portion 502 and/or the mating portion 534, etc.) so as to guide and/or position the battery pack 142 within bay 720. While the projection 730 is shown as a dovetail projection, it should be understood that the projection 730 may be any other suitable receiver (e.g. a bumper, a chamfer edge, a bevel edge, a groove, etc.) configured to guide and/or position the battery pack 142 within the receptacle 140. Further, while the projection 730 is shown to be positioned at a bottom portion of the bay 720, the projection 730 may be positioned at any suitable location of the bay 720 (e.g., a side portion, a rear portion, a front portion, etc.).

As shown in FIG. 9, each bay 720 also includes a dock (e.g., dock 600 of FIG. 6), configured to selectively and electrically couple components of the battery pack 142, so as to receive power from the battery pack 142. According to an exemplary embodiment, the dock 600 is spaced a distance away from a bottom portion of the bay 720 (e.g., the bottom wall 712). As shown in FIG. 9, the dock 600 is positioned at a top portion of the bay 720 (e.g., the top wall 710); however, in other embodiments the dock 600 is positioned at another suitable location within the bay 720 (e.g., at a middle portion of a side, at a rear portion of a side, etc.). In an exemplary embodiment, as the battery pack 142 is moved into the bay 720 (e.g., via the projection 730), the edges 604 of the dock 600 guide the battery pack 142 relative to the receiving portion 602 of the dock 600. As the battery pack 142 moves relative to the receiving portion 602, the upper modular portion 502 and/or the mating portion 534 of the battery pack 142 may engage the bar 610 and/or the latch 612 of the dock 600. According to an exemplary embodiment, the bar 610 and/or the latch 612 selectively couple the battery pack 142 (e.g., the mating portion 534), and the power connector 614 of the dock 600 electrically couples the ports 542 of the battery pack 142 in an installed configuration. As discussed above, in the installed configuration, the battery pack 142 may be configured to transfer power to the receptacle 140 (e.g., via the dock 600), so as to provide power to components of the tractor 100. It should be understood that while the dock is shown as dock 600, the dock may be another suitable connector that includes additional, fewer, and/or different working components.

Figure 10:
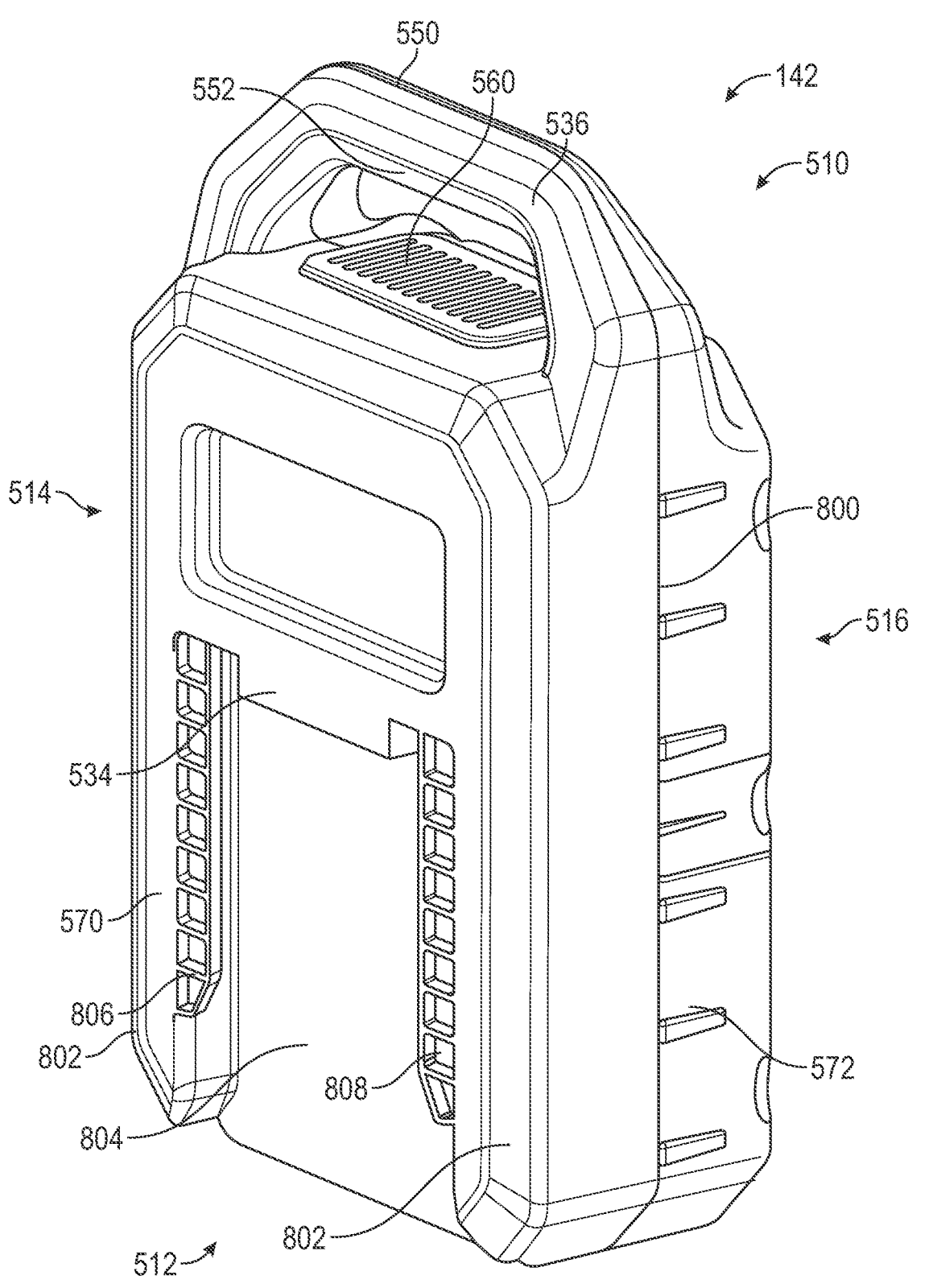
FIG. 10 is a perspective view of a battery pack for use with the battery assembly of FIG. 3, according to an exemplary embodiment.
Figure 11:
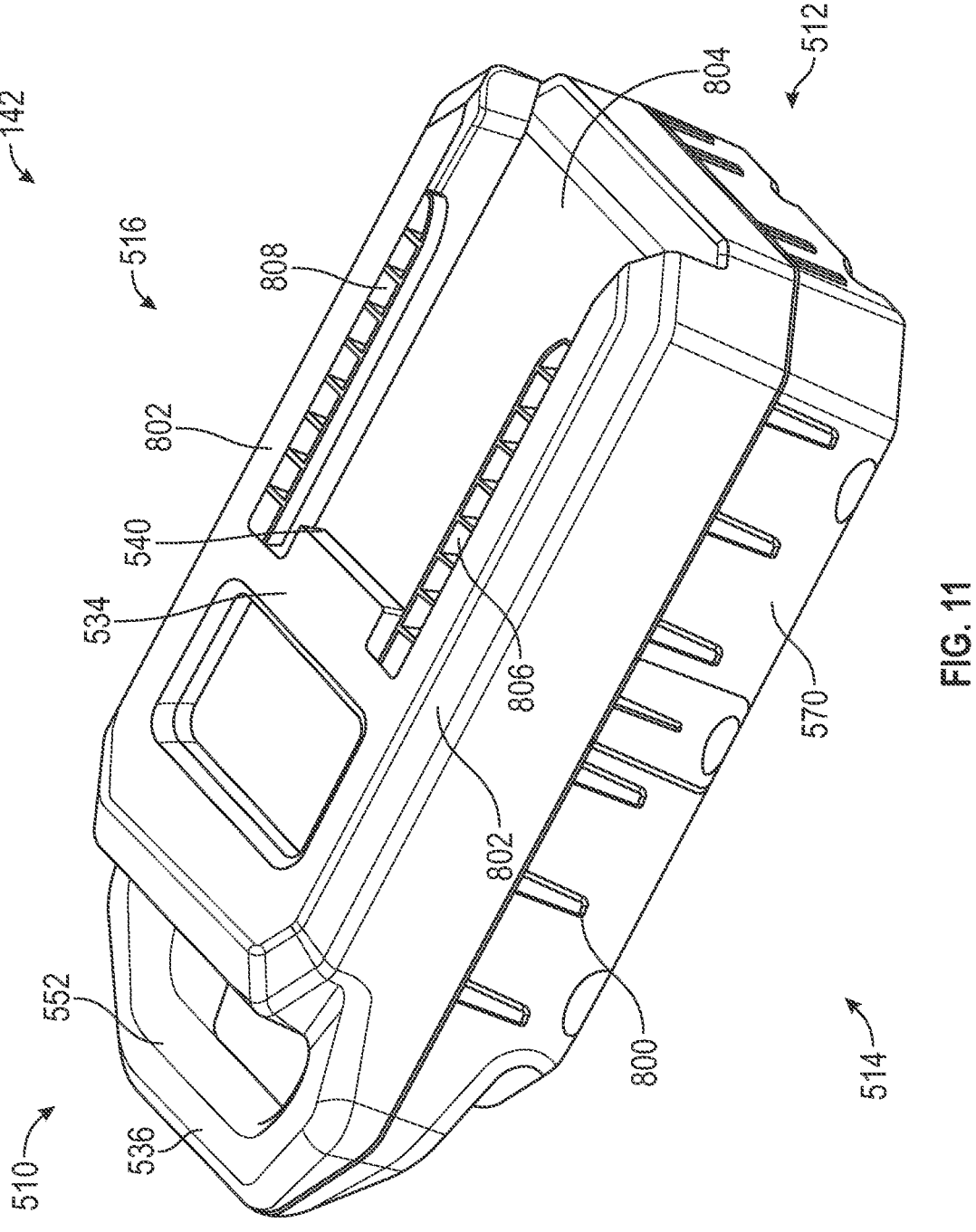
FIG. 11 is another perspective view of the battery pack of FIG. 10.

Referring now to FIGS. 10-11, a battery pack is shown, according to an exemplary embodiment. The components of the battery pack of FIGS. 10-11 are similar to the components of the battery pack 142 shown in FIGS. 6-7, and thus, similar reference numerals are used to refer to each of the similar components.

As shown in FIGS. 10-11, the battery pack 142 includes a battery housing 800 that surrounds (e.g., houses, contains, etc.) the battery 500 (not shown). As discussed above, the battery 500 may be a Lithium-ion battery, and may include a plurality of cells (e.g., Lithium-ion cells) arranged in a variety of series and parallel configurations. The battery housing 800 may be a unified component, and may be coupled to the upper portion 510, the lower portion 512, the left side 514, and the right side 516 of the battery 500. The battery housing 800 may be coupled to the battery 500 via any suitable machining technique (e.g., diecast, mold, etc.), and may be formed of a suitable polymer material, (e.g., a polymer, diecast aluminum, or a combination of polymer components and aluminum components). In some embodiments, the battery housing 800 includes the casings 530, 570, and 572; however, in other embodiments the battery housing 800 and the casings 530, 570, and 572 are a unified component configured to surround and/or protect the battery 500. Further, in some embodiments the battery housing 800 includes the handle 536; however, in other embodiments the battery housing 800 and the handle 536 are a unified component configured to aid in selectively moving, repositioning, inserting/removing, etc. the battery pack 142.

As shown in FIGS. 10-11, the battery housing 800 also includes at least one guide shown as edge 802 (or a plurality of edges 802). According to an exemplary embodiment, the edge(s) 802 is/are chamfer edges that extend (e.g., vertically) along the left side 514 and/or the right side 516 of the battery 500, and is/are configured to aid in guiding and/or positioning the battery pack 142. According to an exemplary embodiment, the edge 802 is a unified chamfer edge that extends along the length of the battery 500; however, in other embodiments, the edge 802 another suitable guide (e.g., projection, surface, another edge, etc.) and/or of another suitable configuration (e.g., divided, non-unified, etc.).

As shown in FIGS. 10-11, the battery housing 800 also include a recess 804 at a middle portion of the battery 500, which is configured to engage (e.g., receive, couple/de-couple, etc.) components of a dock (e.g., the dock 600). The recess 804 may also include additional guides (e.g., projections 806, 808), which may configured to engage (e.g., couple/de-couple, etc.) components of a dock, so as to guide and/or stabilize the battery pack 142 in position relative to the dock. According to an exemplary embodiment, the mating portion 534 is positioned at a top portion of the recess 804 (e.g., at a middle portion of the battery 500, the battery housing 800, etc.), and includes the aperture 540 and one or more pack connectors (e.g., ports 542) configured to selectively and electrically couple/de-couple the battery pack 142 to one or more power connectors (e.g., of a dock).

Figure 12:
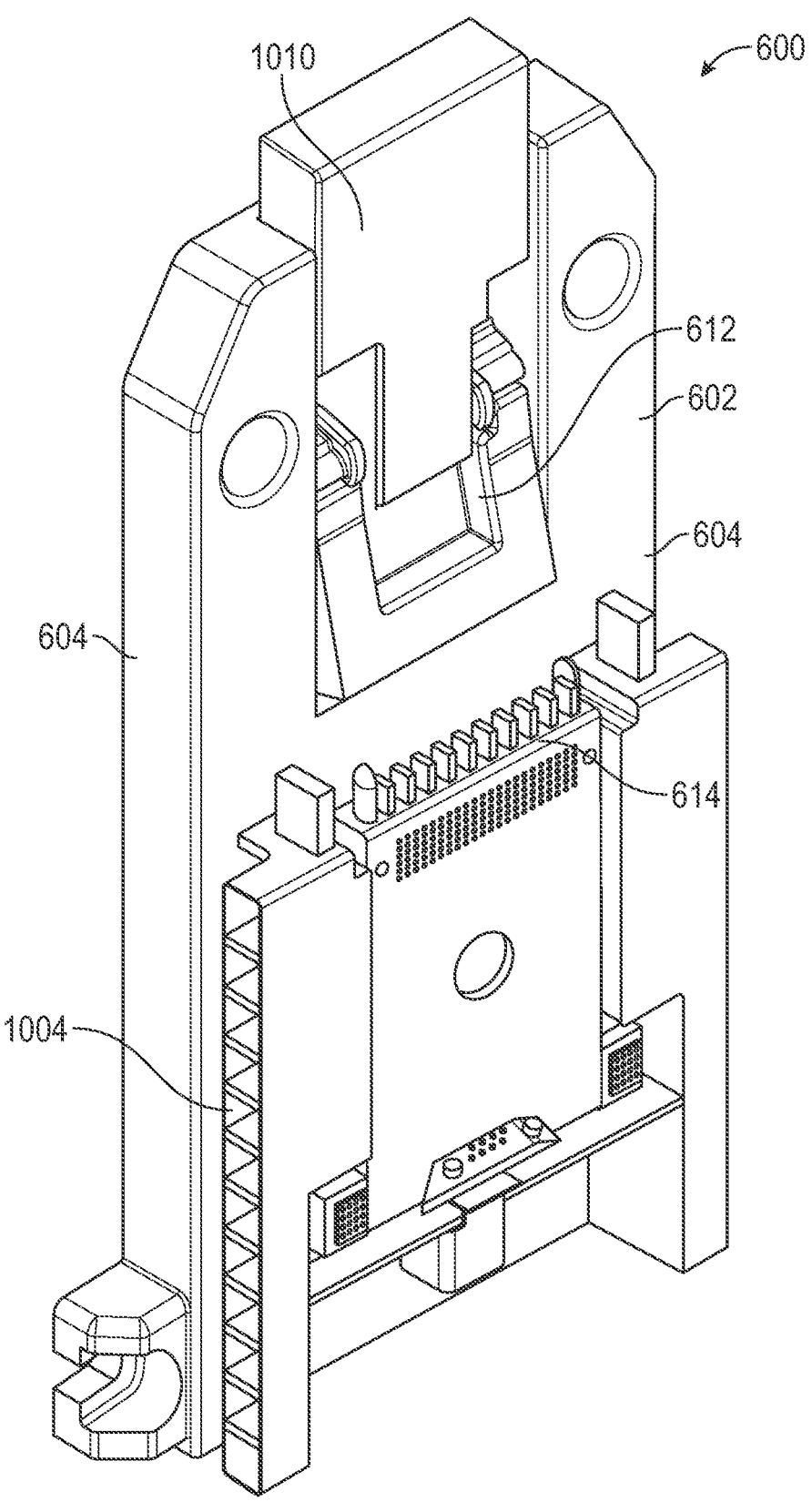
FIG. 12 is a perspective view of a portion of a receptacle for use with the battery pack of FIG. 10, according to an exemplary embodiment.

Referring now to FIG. 12, a dock is shown, according to an exemplary embodiment. The components of the dock of FIG. 12 are similar to the components of the dock 600 shown in FIG. 8, and thus, similar reference numerals are used to refer to each of the similar components.

As shown in FIG. 12, the dock 600 includes the receiving portion 602 and the at least one guide (e.g., edges 604). According to the exemplary embodiment of FIG. 12, the receiving portion 602 is a surface, and is configured to engage (e.g., couple/de-couple, etc.) components of the battery pack 142 (e.g., the recess 804). The edges 604 are shown to include a chamfer edge, which may be configured to aid in guiding and/or positioning the battery pack 142 relative to the receiving portion 602. In some embodiments, the dock 600 includes additional guides (e.g., receivers 1004, 1006), which are configured to engage (e.g., couple/de-couple, etc.) components of the battery pack 142 (e.g., the projections 806, 808, respectively), so as to guide and/or stabilize the battery pack 142 in position relative to the dock 600. In the exemplary embodiment of FIG. 12, the embrace (e.g., the bar 610) is a block 1010. In some embodiments, the block 1010 is rotatably coupled to a top portion of the dock 600, such that the block 1010 aids in guiding and/or positioning the battery pack 142 relative to the dock 600. Further, the power connector 614 is shown as a single electrical connector (e.g., a dock connector, etc.), which extends laterally across the dock 600 (e.g., between the edges 604) and is configured to selectively and electrically couple components of the battery pack 142 (e.g., the pack connectors, ports 542, etc.).

Figure 13:
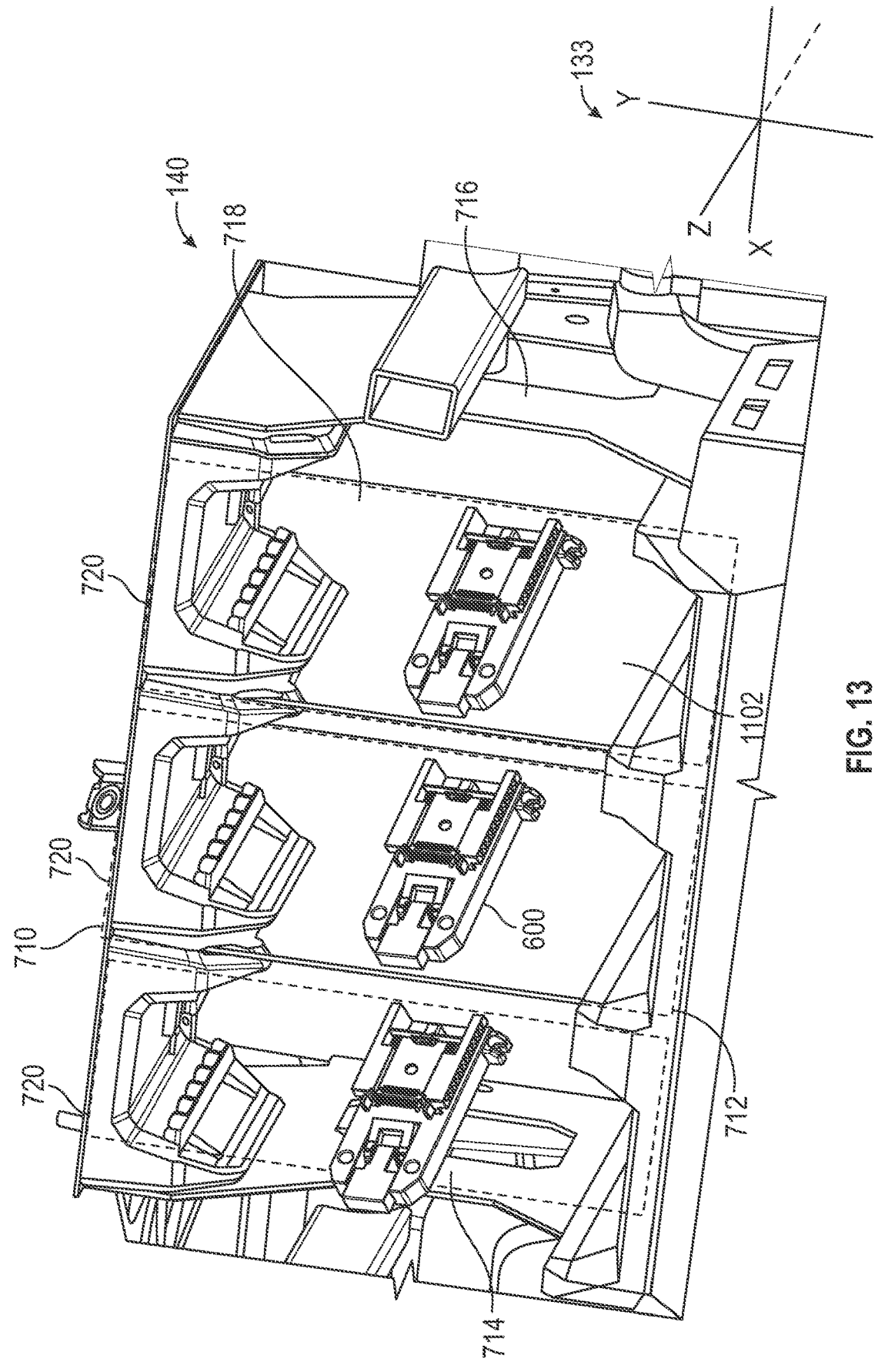
FIG. 13 is a perspective view of a receptacle for use with the battery assembly of FIG. 3, according to an exemplary embodiment.

Referring now to FIG. 13, a receptacle is shown, according to an exemplary embodiment. The components of the receptacle of FIG. 13 are similar to the components of the receptacle 140 shown in FIG. 9, and thus, similar reference numerals are used to refer to each of the similar components.

As shown in FIG. 13, the receptacle 140 includes the plurality of bays 720, which are defined at least in part by the top wall 710, the bottom wall 712, and the rear wall 718. According to an exemplary embodiment, the receptacle 140 also includes a dividing wall 1102 (or a plurality of dividing walls 1102), which extend between the bottom wall 712 and the top wall 710 and/or define a side wall of at least one of the plurality of bays 720. In an exemplary embodiment, each bay 720 includes at least one receive (e.g., the projection 730), which is a bevel edge. The bevel edge may engage components of the battery pack 142 (e.g., the edge(s) 802, etc.), so as to aid in guiding and/or positioning the battery pack 142 within the bay 720. As shown in FIG. 13, each bay 720 includes the dock 600, which is spaced a distance away from a bottom portion of the bay 720 (e.g., the bottom wall 712). According to an exemplary embodiment, the dock 600 is positioned at a middle-side portion of the bay 720, for example at a middle portion of the first sidewall 714, the dividing wall 1102, and/or the second sidewall 716. In some embodiments, the dock 600 is positioned at a middle-side portion of the bay 720 (e.g., at the first sidewall 714, the dividing wall 1102, the second sidewall 716, etc.), proximate to a rear portion of the bay 720 (e.g., the rear wall 718).

As an illustrative example, a user may install a battery pack 142 into a tractor 100, so as to power the tractor 100. According to an exemplary embodiment, a user may receive an indication (e.g., via an interface, the controller 160, etc.) that the tractor 100 needs a battery pack 142 (e.g., the battery assembly 132 is in an uninstalled configuration). In some embodiments, the user notices that the tractor 100 needs a battery pack 142 (e.g., the battery assembly 132 is observed to be in an uninstalled configuration by viewing the receptacle 140 through the transparent surface 152). The user may carry the battery pack 142 (e.g., via the handle 536) toward the front portion of the tractor 100. The user may rotate the hood 150 into an open position, so as to expose the battery assembly 132 and/or the receptacle 140. According to an exemplary embodiment, the receptacle 140 is angled (e.g., at the angle 200, 15 degrees) relative to a plane when the tractor 100 is in an operating position (e.g., the operating plane 134, a plane parallel to the frame members of the tractor 100, a substantially horizontal longitudinal plane, etc.). In this regard, the angled receptacle 140 may ease the installment of the battery pack 142 for the user (e.g., via gravity, effects of the incline angle, downward forces, etc.). The user may then lift/move the battery pack 142 toward/into the receptacle 140. As the battery pack 142 is moved/slid into the receptacle 140, the projection 730 may engage the slot 576 and/or the slot 532, and guide the battery pack 142 within the receptacle 140. Further, as the battery pack 142 is moved/slid toward the rear wall 718 (e.g., the rear portion of the receptacle 140), the edges 604 of the dock 600 may guide the lower modular portion 504, the upper modular portion 502, and/or the mating portion 534 (of the battery pack 142) to the receiving portion 602. Once appropriately positioned proximate to the receiving portion 602, the battery pack 142 may be moved/slid (e.g., dropped, lowered, etc.), such that the bar 610 and/or the latch 612 may couple the upper modular portion 502 and/or the mating portion 534 of the battery pack 142 to secure the battery pack 142 in position within the receptacle 140. Further, the power connector 614 may electrically couple the ports 542 of the battery pack 142; thus, creating an electrical connection between the battery pack 142 and the tractor 100 (e.g., the receptacle 140). According to an exemplary embodiment, the battery pack 142 may then transfer power (e.g., via the power connector 614) to the receptacle 140 and/or the battery assembly 132, such that the battery pack 142 may provide power to components of the tractor 100.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The construction and arrangement of the battery assembly of the ride-on tractor mower as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A ride-on outdoor power equipment, comprising:
a chassis having a front portion and a rear portion;
a pair of front wheels coupled with the chassis, the pair of front wheels located at the front portion of the chassis;
a pair of rear wheels coupled with the chassis, the pair of rear wheels located at the rear portion of the chassis;
a mower deck supported by the chassis, the mower deck including a plurality of mower blades;
a cover rotatably coupled to a front portion of the chassis; and
a battery assembly arranged underneath the cover, when the cover is in a closed position, the battery assembly configured to power a drive motor, the battery assembly comprising:
a plurality of battery packs, each battery pack including a plurality of lithium-ion battery cells and a pack connector; and
a receptacle defined in part by a bottom wall, the receptacle comprising a plurality of bays, each bay having:
a receiver extending away from the bottom wall, the receiver configured to guide a battery pack within the bay; and
a power connector spaced a distance from the bottom wall, the power connector configured to engage the pack connector to electrically couple the battery pack to the receptacle,
wherein the receptacle is angled at an acute angle relative to an operating plane.

2. The ride-on outdoor power equipment of claim 1, further comprising an operator seat, wherein the battery assembly is located forward relative to the operator seat.

3. The ride-on outdoor power equipment of claim 1, wherein the receptacle is angled 15 degrees relative to the operating plane.

4. The ride-on outdoor power equipment of claim 1, wherein the receptacle is angled between 10 and 20 degrees relative to the operating plane.

5. The ride-on outdoor power equipment of claim 1, wherein each battery pack includes a slot, and each receiver of the battery assembly is a dovetail shaped projection configured to engage the slot of one of the battery packs.

6. The ride-on outdoor power equipment of claim 1, wherein the power connector is coupled with a top wall of the receptacle.

7. The ride-on outdoor power equipment of claim 1, wherein each battery pack includes a chamfered edge, and each receiver of the battery assembly includes a bevel that is configured to engage the chamfered edge of at least one of the battery packs.

8. The ride-on outdoor power equipment of claim 1, wherein the receptacle further comprises a dividing wall that extends from the bottom wall, wherein the dividing wall is perpendicular to the bottom wall.

9. The ride-on outdoor power equipment of claim 8, wherein the power connector is coupled with the dividing wall, the power connector positioned adjacent a rear wall of the receptacle.

10. The ride-on outdoor power equipment of claim 1, wherein a rear wall of the receptacle is angled relative to the operating plane.

11. The ride-on outdoor power equipment of claim 1, wherein each battery pack includes a mating portion, and each bay includes a dock having a latch configured to couple the mating portion to secure the battery pack within the receptacle.

12. The ride-on outdoor power equipment of claim 1, wherein:
the cover is rotatable between an open position and the closed position;
the cover protects the battery pack from exposure to an outside environment when the cover is in the closed position; and
the cover provides a user with access to the plurality of battery packs when in the open position.

13. The ride-on outdoor power equipment of claim 12, wherein the cover further includes a transparent surface, and wherein the transparent surface allows the user to observe the plurality of battery packs when the cover is in the closed position.

14. The ride-on outdoor power equipment of claim 1, wherein each of the battery packs defines a central axis extending between a handle and a base of the battery packs, wherein the central axis is angled at an acute angle relative to the operating plane, wherein the ride-on outdoor power equipment defines a centerline that extends longitudinally along the ride-on outdoor power equipment and an X-Z plane that is parallel to the centerline, and wherein the acute angle defined between the central axis and the operating plane is parallel to or within the X-Z plane.

15. A ride-on outdoor power equipment, comprising:
a hood rotatable between an open position and a closed position;
a plurality of battery packs, each battery pack including a plurality of lithium-ion battery cells and a pack connector, wherein each of the battery packs is enclosed by the hood, when the hood is in the closed position; and
a receptacle defined in part by a bottom wall, the receptacle comprising a plurality of bays, each bay having:

a receiver extending away from the bottom wall, the receiver configured to guide a battery pack within the bay; and a power connector spaced a distance from the bottom wall, the power connector configured to engage the pack connector to electrically couple the battery pack to the receptacle, wherein at least one of the plurality of battery packs is angled at an acute angle relative to an operating plane.

16. The ride-on outdoor power equipment of claim 15, wherein the receptacle is angled 15 degrees relative to the operating plane.

17. The ride-on outdoor power equipment of claim 15, wherein the receptacle is angled between 10 and 20 degrees relative to the operating plane.

18. The ride-on outdoor power equipment of claim 15, wherein each battery pack includes a slot, and each receiver is a dovetail shaped projection that is configured to engage the slot of at least one of the battery packs.

19. The ride-on outdoor power equipment of claim 15, wherein the power connector is coupled with a top wall of the receptacle.

20. A ride-on outdoor power equipment, comprising:

a hood rotatable between an open position and a closed position; and a receptacle defined in part by a bottom wall and enclosed by the hood, when the hood is in the closed position, the receptacle comprising a plurality of bays, each bay having:

a receiver extending away from the bottom wall, the receiver configured to guide a battery pack within the bay; and a power connector spaced a distance from the bottom wall, the power connector configured to engage a pack connector to electrically couple the battery pack to the receptacle, wherein the battery pack includes an upper portion and a lower portion, and a central axis extending between the upper portion and the lower portion, and wherein the central axis of the battery pack is angled relative to an operating plane.

\* \* \* \* \*